(12) United States Patent
Xu et al.

(10) Patent No.: US 11,940,600 B2
(45) Date of Patent: Mar. 26, 2024

(54) CAMERA LENS ASSEMBLY

(71) Applicant: ZHEJIANG SUNNY OPTICAL CO., LTD, Ningbo (CN)

(72) Inventors: Biao Xu, Ningbo (CN); Kaiyuan Zhang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 842 days.

(21) Appl. No.: 17/010,206

(22) Filed: Sep. 2, 2020

(65) Prior Publication Data

US 2020/0400924 A1 Dec. 24, 2020

Related U.S. Application Data

(63) Continuation of application No. PCT/CN2019/081357, filed on Apr. 4, 2019.

(30) Foreign Application Priority Data

Jul. 2, 2018 (CN) .......................... 201810709995.7

(51) Int. Cl.
*G02B 13/00* (2006.01)
*G02B 9/64* (2006.01)
*G02B 13/06* (2006.01)

(52) U.S. Cl.
CPC ........... *G02B 13/0045* (2013.01); *G02B 9/64* (2013.01); *G02B 13/06* (2013.01)

(58) Field of Classification Search
None
See application file for complete search history.

(56) References Cited

U.S. PATENT DOCUMENTS 9,964,739 B1 5/2018 Shi
9,995,913 B1 6/2018 Fang
(Continued)

FOREIGN PATENT DOCUMENTS

CN 104570279 A 4/2015
CN 105204144 A 12/2015
(Continued)

OTHER PUBLICATIONS

International Search Report from corresponding International Application No. PCT/CN2019/081357, dated Jun. 27, 2019, pp. 1-4, National Intellectual Property Administration, PRC, Beijing, China.
(Continued)

*Primary Examiner* — Robert E. Tallman
(74) *Attorney, Agent, or Firm* — HAUPTMAN HAM, LLP

(57) ABSTRACT

The present disclosure discloses a camera lens assembly including, sequentially from an object side to an image side along an optical axis, a first lens, a second lens, a third lens, a fourth lens, a fifth lens, a sixth lens and a seventh lens. The first lens has negative refractive power; the second lens has positive refractive power, and an image-side surface thereof is a concave surface; the third lens has positive refractive power, and an image-side surface thereof is a convex surface; the fourth lens has refractive power; the fifth lens has refractive power; the sixth lens has positive refractive power; and the seventh lens has negative refractive power. And an effective focal length f2 of the second lens and a total effective focal length f of the camera lens assembly satisfy $2<f2/f<4.5$.

19 Claims, 15 Drawing Sheets

(56) References Cited

U.S. PATENT DOCUMENTS

2014/0226220 A1    8/2014  Tsai et al.
2017/0184821 A1*   6/2017  Shi .......................... G02B 9/64

FOREIGN PATENT DOCUMENTS

| | | |
|---|---|---|
| CN | 105676422 A | 6/2016 |
| CN | 106842512 A | 6/2017 |
| CN | 107015347 A | 8/2017 |
| CN | 108132526 A | 6/2018 |
| CN | 207557562 U | 6/2018 |
| CN | 108873253 A | 11/2018 |
| CN | 208506350 U | 2/2019 |

OTHER PUBLICATIONS

First Examinaton Report issued in corresponding Indian patent application No. 202017038704, dated Jun. 29, 2021; 6 pgs.
International Search Report from corresponding International Application No. PCT/CN2019/081357, dated Jun. 27, 2019, pp. 1-9, National Intellectual Property Administration, PRC, Beijing, China.

* cited by examiner

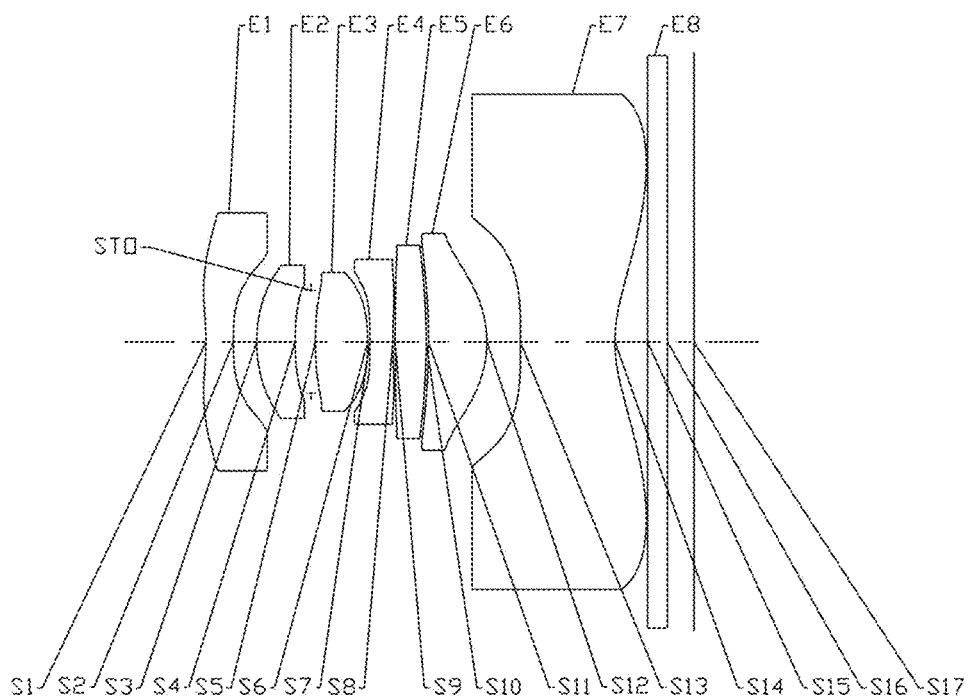
Fig. 17
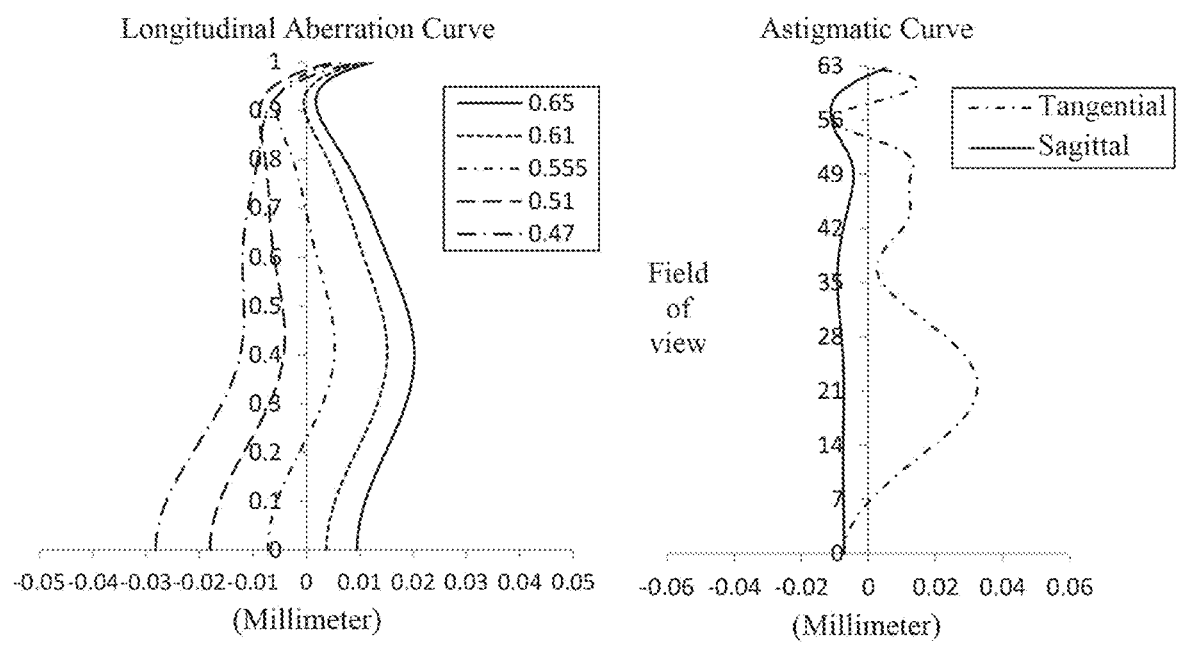
Fig. 18A
Fig. 18B

CAMERA LENS ASSEMBLY

CROSS-REFERENCE TO RELATED APPLICATIONS

The present patent application is a continuation of International Application No. PCT/CN2019/081357, filed on Apr. 4, 2019, which claims priority to Chinese Patent Application No. 201810709995.7, filed before the China National Intellectual Property Administration (CNIPA) on Jul. 2, 2018. Both of the aforementioned patent applications are hereby incorporated by reference in their entireties.

TECHNICAL FIELD

The present disclosure relates to a camera lens assembly, and more specifically, relates to a camera lens assembly including seven lenses.

BACKGROUND

With the rapid upgrading of the portable consumer electronic products, such as smart phones, portable computers and tablet devices, the market puts forward higher and higher demands for the quality of the camera lens assembly used in the portable electronic products. In the currently emerging dual-camera technology, in addition to the characteristics of high pixel, high resolution, and high relative brightness, the camera lens assembly used in the mobile phone is also required to have a large field-of-view. At the same time, with the gradual thinning of high-end electronic products, the camera lens assembly mounted on electronic products should also achieve the characteristic of ultra-thin while ensuring high image quality and large field-of-view.

SUMMARY

The present disclosure provides a camera lens assembly that is applicable to portable electronic products and at least solves or partially addresses at least one of the above disadvantages of the prior art.

In one aspect, the present disclosure provides a camera lens assembly which includes, sequentially from an object side to an image side along an optical axis, a first lens, a second lens, a third lens, a fourth lens, a fifth lens, a sixth lens and a seventh lens. The first lens may have negative refractive power; the second lens may have positive refractive power, and an image-side surface thereof may be a concave surface; the third lens may have positive refractive power, and an image-side surface thereof may be a convex surface; the fourth lens has positive refractive power or negative refractive power; the fifth lens has positive refractive power or negative refractive power; the sixth lens may have positive refractive power; and the seventh lens may have negative refractive power.

In one embodiment, an effective focal length $f2$ of the second lens and a total effective focal length $f$ of the camera lens assembly may satisfy $2<f2/f<4.5$.

In one embodiment, an effective focal length $f2$ of the second lens, an effective focal length $f1$ of the first lens and a total effective focal length $f$ of the camera lens assembly may satisfy $3.5<(f2-f1)/f<6.5$.

In one embodiment, a distance TTL along the optical axis from an object-side surface of the first lens to an imaging plane of the camera lens assembly and half of a diagonal length ImgH of an effective pixel area on the imaging plane of the camera lens assembly may satisfy $TTL/ImgH<2$.

In one embodiment, an effective radius DT11 of an object-side surface of the first lens and half of a diagonal length ImgH of an effective pixel area on an imaging plane of the camera lens assembly may satisfy $0.3<DT11/ImgH<0.6$.

In one embodiment, an effective focal length $f3$ of the third lens and a total effective focal length $f$ of the camera lens assembly may satisfy $1<f3/f<1.8$.

In one embodiment, an effective focal length $f7$ of the seventh lens and a total effective focal length $f$ of the camera lens assembly may satisfy $-3<f7/f<-1$.

In one embodiment, a radius of curvature R14 of an image-side surface of the seventh lens and a total effective focal length $f$ of the camera lens assembly may satisfy $0.2<R14/f<0.8$.

In one embodiment, an edge thickness ET7 of the seventh lens and a center thickness CT7 of the seventh lens along the optical axis may satisfy $1.5<ET7/CT7<2.5$.

In one embodiment, an effective radius DT32 of the image-side surface of the third lens and an effective radius DT42 of an image-side surface of the fourth lens may satisfy $0.7<DT32/DT42<1$.

In one embodiment, a radius of curvature R3 of an object-side surface of the second lens and a radius of curvature R4 of the image-side surface of the second lens may satisfy $|(R3-R4)/(R3+R4)|<0.5$.

In one embodiment, a center thickness CT3 of the third lens along the optical axis, a center thickness CT2 of the second lens along the optical axis and a center thickness CT4 of the fourth lens along the optical axis may satisfy $0.8<CT3/(CT2+CT4)<1.2$.

In one embodiment, the camera lens assembly further includes a stop, a distance SD along the optical axis from the stop to an image-side surface of the seventh lens and a distance TD along the optical axis from an object-side surface of the first lens to the image-side surface of the seventh lens may satisfy $0.6<SD/TD<0.8$. Optionally, the stop may be disposed between the second lens and the third lens.

In one embodiment, an edge thickness ET2 of the second lens and a center thickness CT2 of the second lens along the optical axis may satisfy $0.5<ET2/CT2<0.8$.

In one embodiment, an object-side surface of the first lens may have an inflection point in an off-axis area. A vertical distance YC1 from a critical point on the object-side surface of the first lens to the optical axis and an effective radius DT11 of the object-side surface of the first lens may satisfy $0.2<YC1/DT11<0.8$.

In another aspect, the present disclosure also provides a camera lens assembly which includes, sequentially from an object side to an image side along an optical axis, a first lens, a second lens, a third lens, a fourth lens, a fifth lens, a sixth lens and a seventh lens. The first lens may have negative refractive power; the second lens may have positive refractive power, and an image-side surface thereof may be a concave surface; the third lens has positive refractive power or negative refractive power, and an image-side surface thereof may be a convex surface; the fourth lens may have negative refractive power; the fifth lens has positive refractive power or negative refractive power; the sixth lens may have positive refractive power; and the seventh lens may have negative refractive power. An effective focal length $f2$ of the second lens, an effective focal length $f1$ of the first lens and a total effective focal length $f$ of the camera lens assembly may satisfy $3.5<(f2-f1)/f<6.5$.

In another aspect, the present disclosure also provides a camera lens assembly which includes, sequentially from an object side to an image side along an optical axis, a first lens, a second lens, a third lens, a fourth lens, a fifth lens, a sixth lens and a seventh lens. The first lens may have negative refractive power; the second lens may have positive refractive power, and an image-side surface thereof may be a concave surface; the third lens has positive refractive power or negative refractive power, and an image-side surface thereof may be a convex surface; the fourth lens has positive refractive power or negative refractive power, and an object-side surface thereof may be a concave surface; the fifth lens has positive refractive power or negative refractive power; the sixth lens may have positive refractive power; and the seventh lens may have negative refractive power.

The present disclosure employs seven lenses, and the camera lens assembly has at least one beneficial effect, such as ultra-thinness, large field-of-view, excellent imaging quality, and low sensitivity and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 17 illustrates a schematic structural view of a camera lens assembly according to Example 9 of the present disclosure; and FIGS. 18A to 18D illustrate a longitudinal aberration curve, an astigmatic curve, a distortion curve, and a lateral color curve of the camera lens assembly of the Example 9, respectively.

DETAILED DESCRIPTION OF EMBODIMENTS

Figure 1:
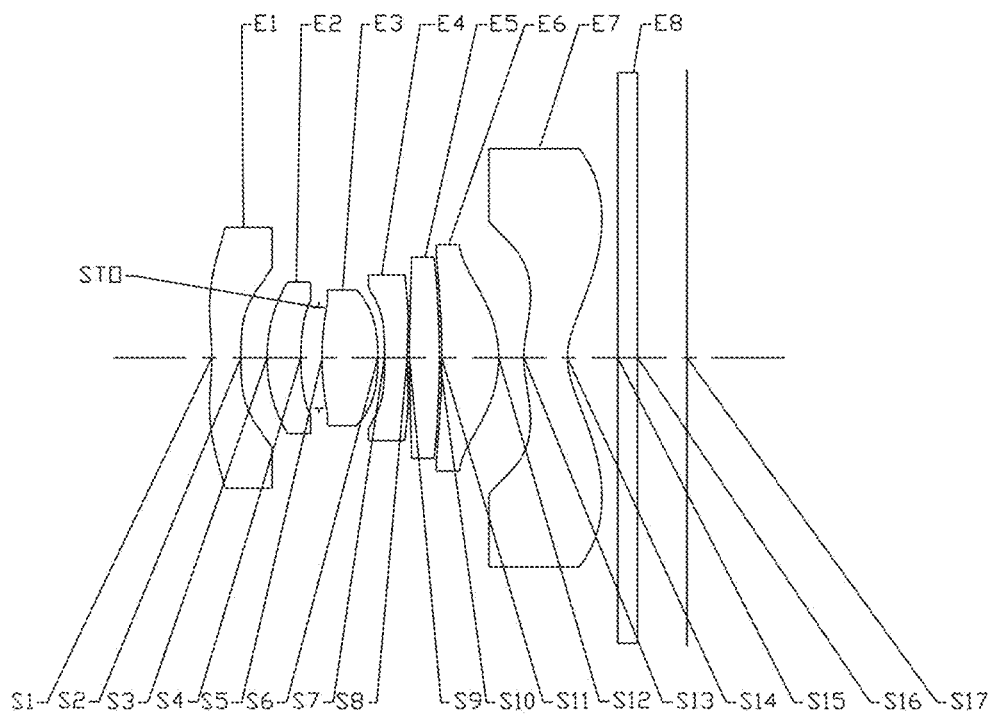
FIG. 1 illustrates a schematic structural view of a camera lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis, and the off-axis area refers to the area other than the area near the optical axis, that is, the area away from the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object side is referred to as an object-side surface of the lens, and the surface closest to the image side is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

A camera lens assembly according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis, and there may be a spaced interval between each two adjacent lenses.

In an exemplary embodiment, the first lens may have negative refractive power. The second lens may have positive refractive power, and an image-side surface thereof may be a concave surface. The third lens may have positive refractive power, and an image-side surface thereof may be a convex surface. The fourth lens has positive refractive power or negative refractive power. The fifth lens has positive refractive power or negative refractive power. The sixth lens may have positive refractive power. The seventh lens may have negative refractive power. By reasonably controlling the refractive power of the first lens, the second lens, and the third lens, the high-order aberrations of the system may be effectively compensated, such that the system has good imaging performance. By reasonably controlling the surface shape of the second lens and the third lens, it may be beneficial to adjust the angle of light and reduce the sensitivity of the system, so that the system has good processing characteristics. By reasonably configuring the fourth lens, the fifth lens, the sixth lens, and the seventh lens, it is beneficial to compensate the low-order aberrations of the system, so that the system has relative small aberrations.

In an exemplary embodiment, the first lens may have negative refractive power. The second lens may have positive refractive power, and an image-side surface thereof may be a concave surface. The third lens has positive refractive power or negative refractive power, and an image-side surface thereof may be a convex surface. The fourth lens may have negative refractive power. The fifth lens has positive refractive power or negative refractive power. The sixth lens may have positive refractive power. The seventh lens may have negative refractive power. By reasonably controlling the refractive power of the first lens, the second lens, and the third lens, the high-order aberrations of the system may be effectively compensated, such that the system has good imaging performance. By reasonably controlling the surface shape of the second lens and the third lens, it may be beneficial to adjust the angle of light and reduce the sensitivity of the system, so that the system has good processing characteristics. By reasonably configuring the fourth lens, the fifth lens, the sixth lens, and the seventh lens, it is beneficial to compensate the low-order aberrations of the system, so that the system has relative small aberrations.

In an exemplary embodiment, the first lens may have negative refractive power. The second lens may have positive refractive power, and an image-side surface thereof may be a concave surface. The third lens has positive refractive power or negative refractive power, and an image-side surface thereof may be a convex surface. The fourth lens has positive refractive power or negative refractive power, and an object-side surface thereof may be a concave surface. The fifth lens has positive refractive power or negative refractive power. The sixth lens may have positive refractive power. The seventh lens may have negative refractive power. By reasonably controlling the refractive power of the first lens, the second lens, and the third lens, the high-order aberrations of the system may be effectively compensated, such that the system has good imaging performance. By reasonably controlling the surface shape of the second lens, the third lens and the fourth lens, it may be beneficial to adjust the angle of light and reduce the sensitivity of the system, so that the system has good processing characteristics. By reasonably configuring the fifth lens, the sixth lens, and the seventh lens, it is beneficial to compensate the low-order aberrations of the system, so that the system has relative small aberrations.

In an exemplary embodiment, an object-side surface of the second lens may be a convex surface. In an exemplary embodiment, an image-side surface of the sixth lens may be a convex surface. In an exemplary embodiment, an image-side surface of the seventh lens may be a concave surface.

In an exemplary embodiment, the camera lens assembly according to the present disclosure may satisfy: $2<f2/f<4.5$, where $f2$ is an effective focal length of the second lens, and $f$ is a total effective focal length of the camera lens assembly. More specifically, $f2$ and $f$ may further satisfy: $2.30 \leq f2/f \leq 4.23$. By controlling the effective focal length of the second lens within a certain range, the system has a reasonable refractive power configuration to reduce the sensitivity of the system.

In an exemplary embodiment, the camera lens assembly according to the present disclosure may satisfy: $3.5<(f2-f1)/f<6.5$, where $f2$ is an effective focal length of the second lens, $f1$ is an effective focal length of the first lens, and $f$ is a total effective focal length of the camera lens assembly. More specifically, $f1$, $f2$ and $f$ may further satisfy: $3.71 \leq (f2-f1)/f \leq 6.09$. By constraining the effective focal lengths of the second lens and the first lens of the camera lens assembly to be within a certain range, respectively, the refractive power of the system may be reasonably distributed to make the system has good image quality, and the sensitivity of the system may be effectively reduced.

In an exemplary embodiment, the camera lens assembly according to the present disclosure may satisfy: $TTL/ImgH<2$, where $TTL$ is a distance along the optical axis from an object-side surface of the first lens to an imaging plane of the camera lens assembly, and $ImgH$ is half of a diagonal length of an effective pixel area on the imaging plane. More specifically, $TTL$ and $ImgH$ may further satisfy: $1.5 \leq TTL/ImgH \leq 1.8$, for example, $1.66 \leq TTL/ImgH \leq 1.69$. By constraining the ratio of the total optical length of the system with respect to the height of the image plane to be within a certain range, the ultra-thin and high-pixel characteristics of the optical system may be achieved.

In an exemplary embodiment, the camera lens assembly according to the present disclosure may satisfy: $1<f3/f<1.8$, where f3 is an effective focal length of the third lens, and f is a total effective focal length of the camera lens assembly. More specifically, f3 and f may further satisfy: $1.09 \leq f3/f \leq 1.60$. By reasonably controlling the effective focal length of the third lens, the third lens may generate negative spherical aberration and compensate the positive spherical aberration generated by other lenses in the system, so that the system has a good image quality in the on-axis field of view.

In an exemplary embodiment, the camera lens assembly according to the present disclosure may satisfy: $-3<f7/f<-1$, where f7 is an effective focal length of the seventh lens, and f is a total effective focal length of the camera lens assembly. More specifically, f7 and f may further satisfy: $-2.89 \leq f7/f \leq -1.28$. By reasonably controlling the effective focal length of the seventh lens, the seventh lens may generate positive astigmatic and compensate the negative astigmatic generated by other lenses in the system, so that the system has good image quality.

In an exemplary embodiment, the camera lens assembly according to the present disclosure may satisfy: $0.3<DT11/ImgH<0.6$, where DT11 is an effective radius of an object-side surface of the first lens, and ImgH is half of a diagonal length of an effective pixel area on an imaging plane of the camera lens assembly. More specifically, DT11 and ImgH may further satisfy: $0.45 \leq DT11/ImgH \leq 0.48$. By controlling the ratio of the effective radius of the object-side surface of the first lens with respect to the image height to be within a certain range, the front lens may have a relative small effective radius, so that the size of front end of the camera lens assembly is relative small.

In an exemplary embodiment, the camera lens assembly according to the present disclosure may satisfy: $0.7<DT32/DT42<1$, where DT32 is an effective radius of the image-side surface of the third lens, and DT42 is an effective radius of an image-side surface of the fourth lens. More specifically, DT32 and DT42 may further satisfy: $0.82 \leq DT32/DT42 \leq 0.98$. By controlling the ratio of the effective radius of the image-side surface of the third lens with respect to the effective radius of the image-side surface of the fourth lens to be within a certain range, the deflection angle of the incident light from the third lens to the fourth lens in the system may be reduced, and the distribution of light beam on the curved surface may be reasonably adjusted to reduce the sensitivity of the system.

In an exemplary embodiment, the camera lens assembly according to the present disclosure may satisfy: $0.2<R14/f<0.8$, where R14 is a radius of curvature of an image-side surface of the seventh lens, and f is a total effective focal length of the camera lens assembly. More specifically, R14 and f may further satisfy: $0.32 \leq R14/f \leq 0.70$. By controlling the ratio of the radius of curvature of the image-side surface of the seventh lens with respect to the total effective focal length of the camera lens assembly, the contribution of the image-side of the seventh lens to the field curvature is within a reasonable range, so as to effectively compensate the field curvature generated by the front group lens.

In an exemplary embodiment, the camera lens assembly according to the present disclosure may satisfy: $|(R3-R4)/(R3+R4)|<0.5$, where R3 is a radius of curvature of an object-side surface of the second lens, and R4 is a radius of curvature of the image-side surface of the second lens. More specifically, R3 and R4 may further satisfy: $0<|(R3-R4)/(R3+R4)|<0.5$, for example, $0.17 \leq |(R3-R4)/(R3+R4)| \leq 0.44$. By constraining the ratio of the difference between the curvature radii of the object-side surface and the image-side surface of the second lens with respect to the sum of the curvature radii of the object-side surface and the image-side surface of the second lens to be within a certain range, the deflection angle of the incident light at the second lens in the system may be effectively reduced, and the distribution of the light beam on the curved surface may be reasonably adjusted to reduce the sensitivity of the system.

In an exemplary embodiment, the camera lens assembly according to the present disclosure may satisfy: $0.8<CT3/(CT2+CT4)<1.2$, where CT2 is a center thickness of the second lens along the optical axis, CT3 is a center thickness of the third lens along the optical axis, and CT4 is a center thickness of the fourth lens along the optical axis. More specifically, CT2, CT3 and CT4 may further satisfy: $0.85 \leq CT3/(CT2+CT4) \leq 1.16$. By reasonably constraining the ratio of the center thickness of the third lens along the optical axis with respect to the sum of the center thicknesses of the second lens and the fourth lens along the optical axis, the coma of the system may be reasonably controlled, so that the optical system has good optical performance.

In an exemplary embodiment, the camera lens assembly may further include a stop to improve the image quality of the lens assembly. A distance SD along the optical axis from the stop to an image-side surface of the seventh lens and a distance TD along the optical axis from an object-side surface of the first lens to the image-side surface of the seventh lens may satisfy $0.6<SD/TD<0.8$. More specifically, SD and TD may further satisfy: $0.68 \leq SD/TD \leq 0.74$. By reasonably setting the position of the stop, the coma, astigmatic, distortion and axial chromatic aberration related to the stop may be effectively corrected. Optionally, the stop may be disposed between the second lens and the third lens.

In an exemplary embodiment, the camera lens assembly according to the present disclosure may satisfy: $0.5<ET2/CT2<0.8$, where ET2 is an edge thickness of the second lens, and CT2 is a center thickness of the second lens along the optical axis. More specifically, ET2 and CT2 may further satisfy: $0.56 \leq ET2/CT2 \leq 0.68$. By controlling the ratio of the edge thickness of the second lens with respect to the center thickness of the second lens along the optical axis to be within a certain range, the system may have the characteristics of easy processing.

In an exemplary embodiment, an object-side surface of the first lens may have at least one inflection point in an off-axis area, and the camera lens assembly according to the present disclosure may satisfy: $0.2<YC1/DT11<0.8$, where YC1 is a vertical distance from a critical point on the object-side surface of the first lens to the optical axis, and DT11 is an effective radius of the object-side surface of the first lens. The critical point of the object-side surface of the first lens refers to the point on the object-side surface of the first lens, except for the intersection point with the optical axis, that is tangent to the tangent plane perpendicular to the optical axis. More specifically, YC1 and DT11 may further satisfy: $0.3<YC1/DT11<0.6$, for example, $0.38 \leq YC1/DT11 \leq 0.47$. By controlling the ratio of the distance from the critical point of the object-side surface of the first lens to the optical axis with respect to the effective radius of the object-side surface of the first lens to be within a certain range, the first lens may generate relative small aberrations, thereby making the system have good image quality.

In an exemplary embodiment, the camera lens assembly according to the present disclosure may satisfy: $1.5<ET7/CT7<2.5$, where ET7 is an edge thickness of the seventh lens, and CT7 is a center thickness of the seventh lens along the optical axis. More specifically, ET7 and CT7 may further satisfy: $1.59 \leq ET7/CT7 \leq 2.14$. By controlling the ratio of the edge thickness of the seventh lens with respect to the center thickness of the seventh lens along the optical axis to be within a certain range, the system may have the characteristics of easy processing.

Optionally, the above camera lens assembly may further include an optical filter for correcting the color deviation and/or a protective glass for protecting the photosensitive element located on an imaging plane.

The camera lens assembly according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the lens assembly may be effectively reduced, and the workability of the lens assembly may be improved, such that the camera lens assembly is more advantageous for production processing and may be applied to portable electronic products. The camera lens assembly configured as described above may also have beneficial effects such as ultra-thinness, large field-of-view, excellent image quality and low sensitivity and the like.

In the embodiments of the present disclosure, at least one of the surfaces of the lenses is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

However, it will be understood by those skilled in the art that the number of lenses constituting the camera lens assembly may be varied to achieve the various results and advantages described in this specification without departing from the technical solution claimed by the present disclosure. For example, although the embodiment is described by taking seven lenses as an example, the camera lens assembly is not limited to include seven lenses. The camera lens assembly may also include other numbers of lenses if desired.

Some specific examples of a camera lens assembly applicable to the above embodiment will be further described below with reference to the accompanying drawings.

Example 1

A camera lens assembly according to example 1 of the present disclosure is described below with reference to FIG. 1 to FIG. 2D. FIG. 1 shows a schematic structural view of the camera lens assembly according to example 1 of the present disclosure.

As shown in FIG. 1, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 shows surface type, radius of curvature, thickness, material and conic coefficient of each lens of the camera lens assembly in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | 0.0340 | | | |
| S1 | Aspheric | −2.4645 | 0.3090 | 1.54 | 55.9 | −35.1015 |
| S2 | Aspheric | 7.7786 | 0.2779 | | | −11.9014 |
| S3 | Aspheric | 1.7953 | 0.3567 | 1.64 | 23.5 | 1.8095 |
| S4 | Aspheric | 2.6250 | 0.1895 | | | 4.6652 |
| STO | Spherical | Infinite | 0.0351 | | | |
| S5 | Aspheric | 3.1286 | 0.5905 | 1.55 | 56.1 | 3.6779 |
| S6 | Aspheric | −2.3739 | 0.0708 | | | 4.6082 |
| S7 | Aspheric | −15.9099 | 0.2400 | 1.67 | 20.4 | −58.9865 |
| S8 | Aspheric | 3.5843 | 0.0240 | | | −43.8941 |
| S9 | Aspheric | 9.4247 | 0.3171 | 1.55 | 56.1 | −65.8689 |
| S10 | Aspheric | −7.5976 | 0.0244 | | | −10.0889 |
| S11 | Aspheric | −10.2592 | 0.6025 | 1.55 | 56.1 | 10.3289 |
| S12 | Aspheric | −1.3657 | 0.2669 | | | −0.2095 |
| S13 | Aspheric | 1.1703 | 0.4618 | 1.54 | 55.9 | −9.7230 |
| S14 | Aspheric | 0.7017 | 0.5324 | | | −3.6356 |

TABLE 1-continued

| Surface number | Surface type | Radius of curvature | Thickness | Material Refractive index | Abbe number | Conic coefficient |
|---|---|---|---|---|---|---|
| S15 | Spherical | Infinite | 0.2100 | 1.52 | 64.2 | |
| S16 | Spherical | Infinite | 0.5230 | | | |
| S17 | Spherical | Infinite | | | | |

As can be seen from Table 1, the object-side surface and the image-side surface of any one of the first lens E1 to the seventh lens E7 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 | A14 | A16 | A18 | A20 |
|---|---|---|---|---|---|---|---|---|---|
| S1 | 3.8228E−01 | −4.8695E−01 | 4.7534E−01 | −3.3137E−01 | 1.4826E−01 | −3.8309E−02 | 4.3290E−03 | 0.0000E+00 | 0.0000E+00 |
| S2 | 8.8489E−01 | −1.0056E+00 | 4.2759E−01 | 2.0301E+00 | −5.1515E+00 | 4.3174E+00 | −1.2020E+00 | 0.0000E+00 | 0.0000E+00 |
| S3 | 1.5552E−01 | −4.5973E−01 | 9.8485E−01 | −1.7318E+00 | 1.2970E+00 | −1.0639E+00 | 1.4193E+00 | 0.0000E+00 | 0.0000E+00 |
| S4 | 1.8983E−01 | −7.2930E−01 | 7.9409E+00 | −4.7813E+01 | 1.7346E+02 | −3.4046E+02 | 2.9693E+02 | 0.0000E+00 | 0.0000E+00 |
| S5 | 7.1511E−02 | −7.0676E−01 | 9.7347E+00 | −8.6892E+01 | 4.6721E+02 | −1.5450E+03 | 3.0354E+03 | −3.2214E+03 | 1.4178E+03 |
| S6 | −4.5021E−01 | 8.8208E−02 | 3.4840E+00 | −3.2326E+01 | 1.3598E+02 | −3.2761E+02 | 4.7968E+02 | −4.0740E+02 | 1.5875E+02 |
| S7 | −9.4410E−01 | 3.0857E+00 | −2.0742E+01 | 1.1102E+02 | −4.2359E+02 | 1.0787E+03 | −1.6971E+03 | 1.4870E+03 | −5.5441E+02 |
| S8 | −7.0087E−01 | 3.1680E+00 | −1.2433E+01 | 3.2609E+01 | −5.6916E+01 | 6.8511E+01 | −5.6088E+01 | 2.8403E+01 | −6.6450E+00 |
| S9 | −3.2551E−01 | 2.5530E+00 | −1.1700E+01 | 3.2681E+01 | −5.8571E+01 | 6.8824E+01 | −5.1772E+01 | 2.2724E+01 | −4.4403E+00 |
| S10 | 5.4699E−02 | 1.4136E−01 | −1.5789E+00 | 5.4729E+00 | −1.0372E+01 | 1.1595E+01 | −7.5737E+00 | 2.6593E+00 | −3.8500E−01 |
| S11 | −3.4068E−02 | 1.8321E−01 | −1.1385E+00 | 4.1357E+00 | −8.1835E+00 | 9.3001E+00 | −6.0399E+00 | 2.0514E+00 | −2.7430E−01 |
| S12 | −3.4569E−01 | 1.5187E+00 | −3.8972E+00 | 7.3090E+00 | −9.2622E+00 | 7.7319E+00 | −4.0230E+00 | 1.1671E+00 | −1.4273E−01 |
| S13 | −4.1109E−01 | 3.6544E−01 | −1.6731E−01 | −3.0054E−01 | 6.5757E−01 | −6.1485E−01 | 3.1522E−01 | −8.4162E−02 | 9.0960E−03 |
| S14 | −2.1472E−01 | 2.1102E−01 | −1.6130E−01 | 8.6664E−02 | −3.1981E−02 | 7.8747E−03 | −1.2308E−03 | 1.1007E−04 | −4.2787E−06 |

Table 3 shows a total optical length TTL (i.e., a distance from the object-side surface S1 of the first lens E1 to the imaging plane S17 along the optical axis), half of a diagonal length ImgH of an effective pixel area on the imaging plane S17, half of a maximal field-of-view HFOV, and a total effective focal length f of the camera lens assembly, and effective focal lengths f1 to f7 of respective lens in example 1.

TABLE 3

| TTL (mm) | 5.03 |
|---|---|
| ImgH (mm) | 3.03 |
| HFOV (°) | 62.6 |
| f (mm) | 2.08 |
| f1 (mm) | −3.45 |
| f2 (mm) | 7.54 |
| f3 (mm) | 2.57 |

TABLE 3-continued

| f4 (mm) | −4.37 |
|---|---|
| f5 (mm) | 7.76 |
| f6 (mm) | 2.82 |
| f7 (mm) | −4.98 |

Figure 2A:
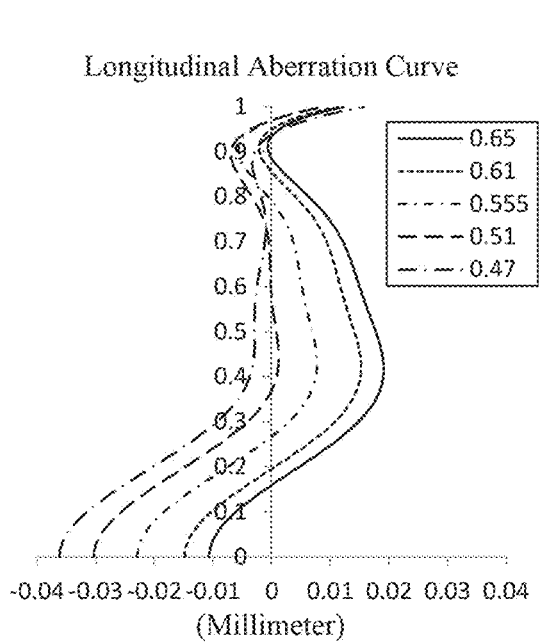
FIGS. 2A to 2D illustrate a longitudinal aberration curve, an astigmatic curve, a distortion curve, and a lateral color curve of the camera lens assembly of the Example 1, respectively.
Figure 2B:
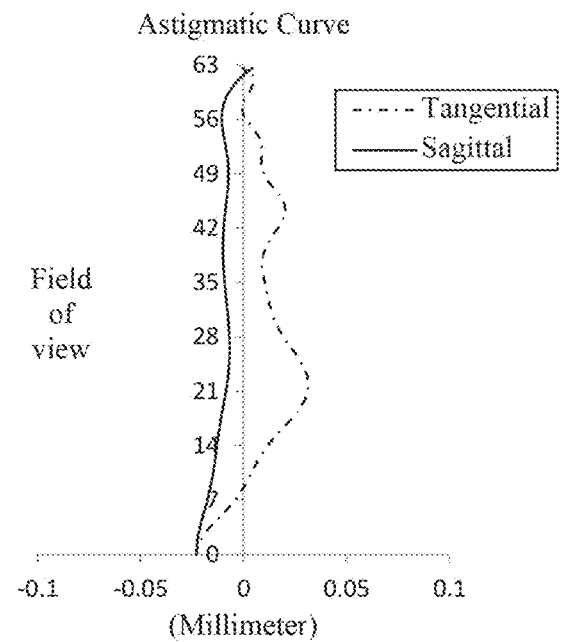
Figure 2C:
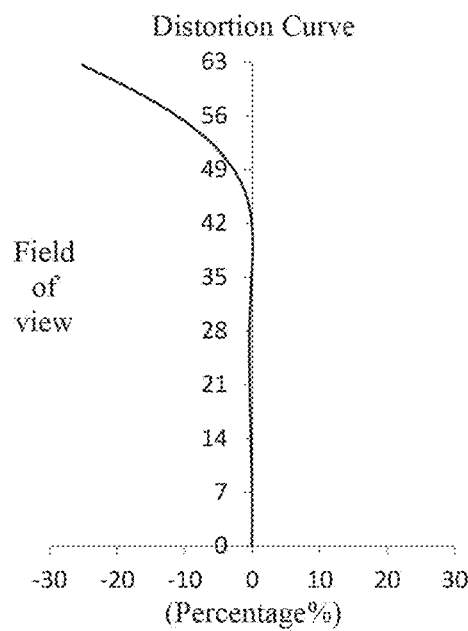
Figure 2D:
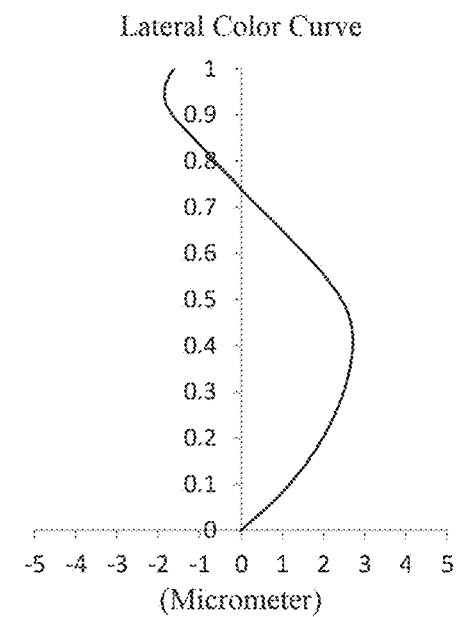

FIG. 2A illustrates a longitudinal aberration curve of the camera lens assembly according to example 1, representing deviations of focal points converged by light of different wavelengths after passing through the lens assembly. FIG. 2B illustrates an astigmatic curve of the camera lens assembly according to example 1, representing a curvature of a tangential plane and a curvature of a sagittal plane. FIG. 2C illustrates a distortion curve of the camera lens assembly according to example 1, representing amounts of distortion corresponding to different field-of-views. FIG. 2D illustrates a lateral color curve of the camera lens assembly according to example 1, representing deviations of different image heights on an imaging plane after light passes through the lens assembly. It can be seen from FIG. 2A to FIG. 2D that the camera lens assembly provided in example 1 may achieve good image quality.

Example 2

Figure 3:
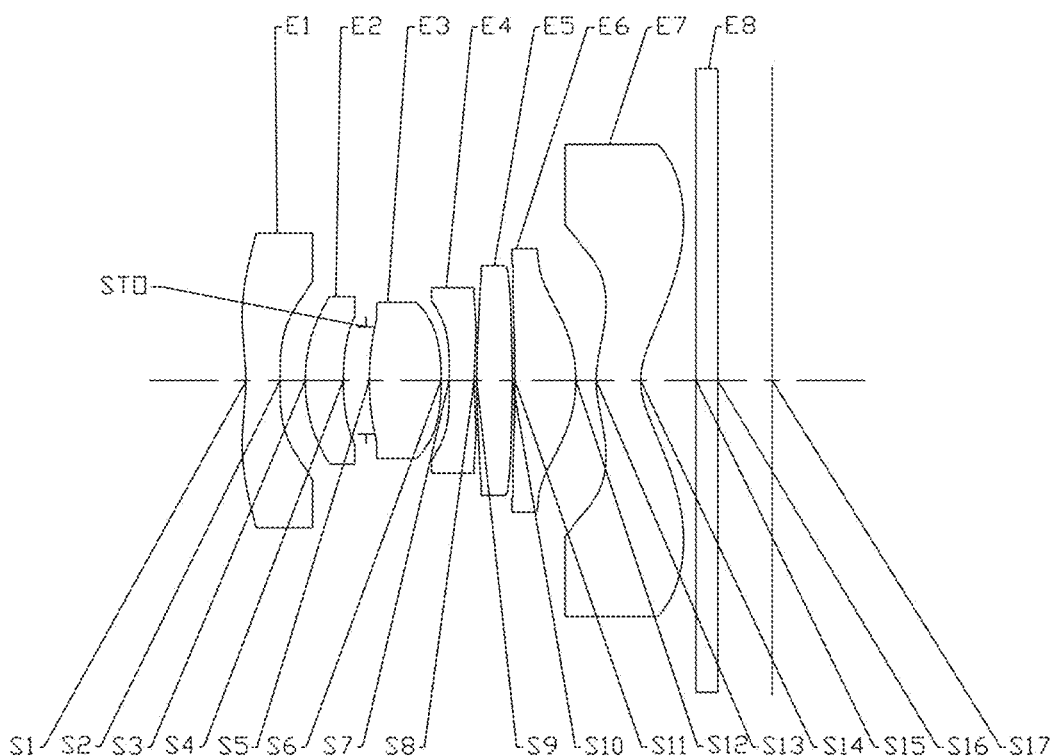
FIG. 3 illustrates a schematic structural view of a camera lens assembly according to Example 2 of the present disclosure.

A camera lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens assembly according to example 2 of the present disclosure.

As shown in FIG. 3, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 4 shows surface type, radius of curvature, thickness, material and conic coefficient of each lens of the camera lens assembly in example 2, wherein the units for the radius of curvature and the thickness are millimeter (mm). Table 5 shows high-order coefficients applicable to each aspheric surface in example 2, wherein the surface shape of each aspheric surface may be defined by the formula (1) given in the above example 1. Table 6 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 2.

TABLE 4

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | −2.0618 | 0.3298 | 1.54 | 55.9 | −27.9273 |
| S2 | Aspheric | 11.4121 | 0.2416 | | | −14.1222 |
| S3 | Aspheric | 1.7191 | 0.3652 | 1.64 | 23.5 | 1.7130 |
| S4 | Aspheric | 2.5197 | 0.2181 | | | 4.6637 |
| STO | Spherical | Infinite | 0.0319 | | | |
| S5 | Aspheric | 2.7135 | 0.6893 | 1.55 | 56.1 | 3.3434 |
| S6 | Aspheric | −2.9074 | 0.0773 | | | 5.4627 |
| S7 | Aspheric | 42.9926 | 0.2400 | 1.67 | 20.4 | −41.2818 |
| S8 | Aspheric | 2.6078 | 0.0240 | | | −36.0002 |
| S9 | Aspheric | 4.9321 | 0.3419 | 1.55 | 56.1 | −99.0000 |
| S10 | Aspheric | −10.7494 | 0.0240 | | | 5.4489 |
| S11 | Aspheric | −18.5754 | 0.5865 | 1.55 | 56.1 | −99.0000 |
| S12 | Aspheric | −1.4098 | 0.1948 | | | −0.2084 |
| S13 | Aspheric | 1.0306 | 0.4277 | 1.54 | 55.9 | −7.7113 |
| S14 | Aspheric | 0.6541 | 0.5307 | | | −3.2473 |
| S15 | Spherical | Infinite | 0.2100 | 1.52 | 64.2 | |
| S16 | Spherical | Infinite | 0.5213 | | | |
| S17 | Spherical | Infinite | | | | |

TABLE 5

| Surface number | A4 | A6 | A8 | A10 | A12 | A14 | A16 | A18 | A20 |
|---|---|---|---|---|---|---|---|---|---|
| S1 | 3.1897E−01 | −3.8237E−01 | 3.4520E−01 | −2.2192E−01 | 9.2845E−02 | −2.2570E−02 | 2.3943E−03 | 0.0000E+00 | 0.0000E+00 |
| S2 | 9.0639E−01 | −1.3545E+00 | 1.9493E+00 | −2.1799E+00 | 1.3720E+00 | −5.8443E−01 | 1.8685E−01 | 0.0000E+00 | 0.0000E+00 |
| S3 | 1.8354E−01 | −5.5260E−01 | 1.3495E+00 | −2.9243E+00 | 3.8286E+00 | −3.5535E+00 | 1.8803E+00 | 0.0000E+00 | 0.0000E+00 |
| S4 | 1.8408E−01 | −3.2589E−01 | 3.0823E+00 | −1.4495E+01 | 4.0691E+01 | −6.1416E+01 | 4.4452E+01 | 0.0000E+00 | 0.0000E+00 |
| S5 | 7.1627E−02 | −7.9409E−01 | 1.1971E+01 | −1.1439E+02 | 6.6144E+02 | −2.3690E+03 | 5.0995E+03 | −6.0385E+03 | 3.0144E+03 |
| S6 | −4.9681E−01 | 9.8532E−01 | −4.9952E+00 | 1.6643E+01 | −4.2216E+01 | 8.0491E+01 | −1.0055E+02 | 6.8814E+01 | −1.9619E+01 |
| S7 | −9.5208E−01 | 2.9751E+00 | −1.6236E+01 | 7.0265E+01 | −2.1974E+02 | 4.6092E+02 | −5.9506E+02 | 4.2381E+02 | −1.2705E+02 |
| S8 | −6.9637E−01 | 3.2187E+00 | −1.3187E+01 | 3.6307E+01 | −6.4313E+01 | 7.1818E+01 | −4.7214E+01 | 1.5754E+01 | −1.7554E+00 |
| S9 | −3.2607E−01 | 2.6178E+00 | −1.2286E+01 | 3.4759E+01 | −6.1878E+01 | 6.9925E+01 | −4.8576E+01 | 1.8928E+01 | −3.1812E+00 |
| S10 | −9.6563E−03 | 9.0054E−01 | −5.4958E+00 | 1.6848E+01 | −3.0592E+01 | 3.4161E+01 | −2.3153E+01 | 8.8038E+00 | −1.4531E+00 |
| S11 | −4.3013E−02 | 5.6093E−01 | −3.7799E+00 | 1.2759E+01 | −2.4026E+01 | 2.6838E+01 | −1.7759E+01 | 6.4598E+00 | −1.0015E+00 |
| S12 | −3.7468E−01 | 1.7928E+00 | −4.7929E+00 | 8.8952E+00 | −1.0748E+01 | 8.3339E+00 | −3.9631E+00 | 1.0402E+00 | −1.1424E−01 |
| S13 | −4.0453E−01 | 5.0066E−01 | −6.7529E−01 | 7.0868E−01 | −5.2887E−01 | 2.4195E−01 | −5.7751E−02 | 5.3637E−03 | 1.0477E−05 |
| S14 | −2.2862E−01 | 2.2593E−01 | −1.6948E−01 | 8.9267E−02 | −3.2513E−02 | 7.9830E−03 | −1.2560E−03 | 1.1388E−04 | −4.5119E−06 |

TABLE 6

| | |
|---|---|
| TTL (mm) | 5.05 |
| ImgH (mm) | 3.03 |
| HFOV (°) | 62.5 |
| f (mm) | 2.01 |
| f1 (mm) | -3.23 |
| f2 (mm) | 7.12 |
| f3 (mm) | 2.69 |
| f4 (mm) | -4.18 |
| f5 (mm) | 6.24 |
| f6 (mm) | 2.76 |
| f7 (mm) | -5.53 |

Figure 4A:
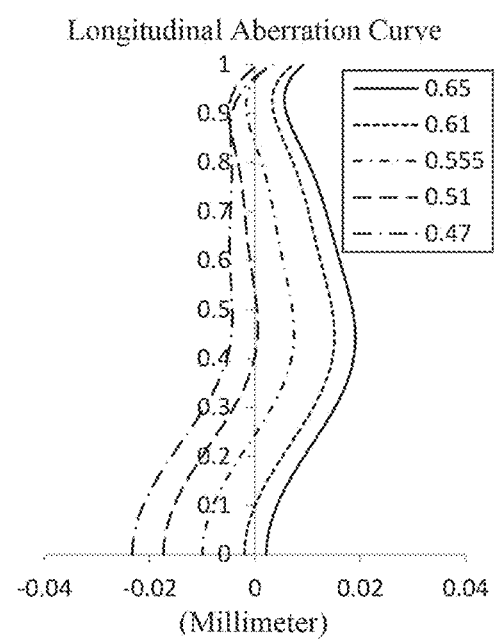
FIGS. 4A to 4D illustrate a longitudinal aberration curve, an astigmatic curve, a distortion curve, and a lateral color curve of the camera lens assembly of the Example 2, respectively.
Figure 4B:
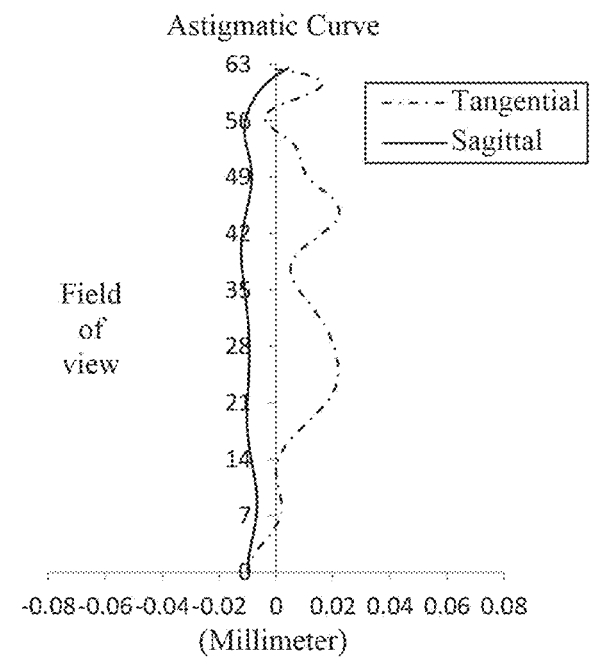
Figure 4C:
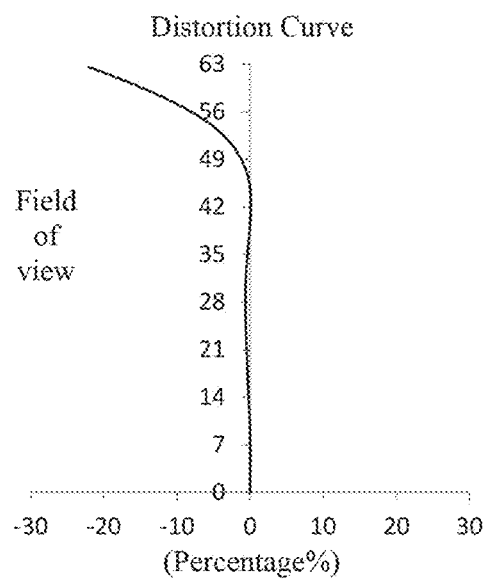
Figure 4D:
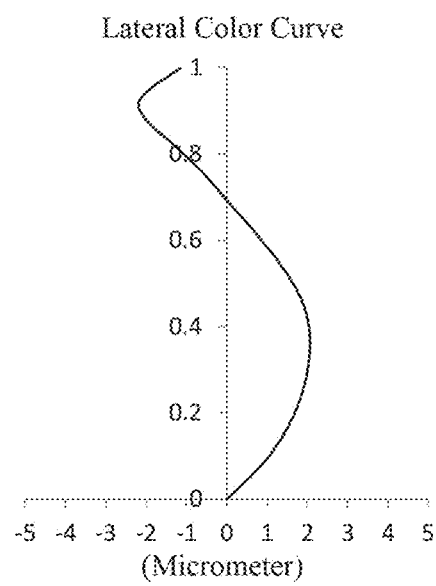

FIG. 4A illustrates a longitudinal aberration curve of the camera lens assembly according to example 2, representing deviations of focal points converged by light of different wavelengths after passing through the lens assembly. FIG. 4B illustrates an astigmatic curve of the camera lens assembly according to example 2, representing a curvature of a tangential plane and a curvature of a sagittal plane. FIG. 4C illustrates a distortion curve of the camera lens assembly according to example 2, representing amounts of distortion corresponding to different field-of-views. FIG. 4D illustrates a lateral color curve of the camera lens assembly according to example 2, representing deviations of different image heights on an imaging plane after light passes through the lens assembly. It can be seen from FIG. 4A to FIG. 4D that the camera lens assembly provided in example 2 may achieve good image quality.

Example 3

Figure 5:
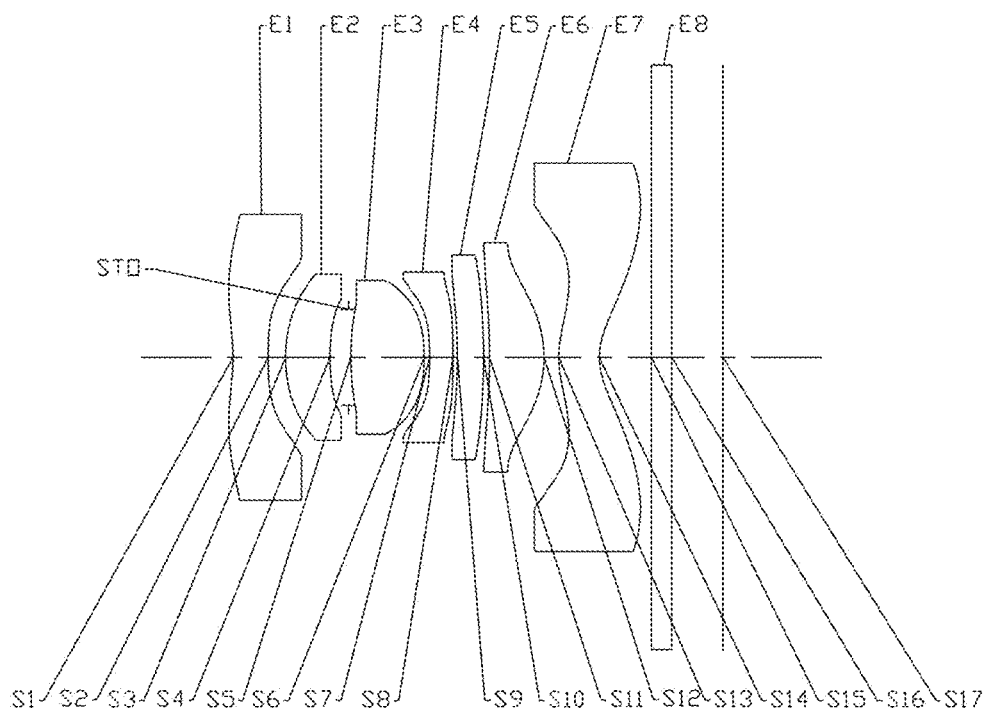
FIG. 5 illustrates a schematic structural view of a camera lens assembly according to Example 3 of the present disclosure.

A camera lens assembly according to example 3 of the present disclosure is described below with reference to FIG. 5 to FIG. 6D. FIG. 5 shows a schematic structural view of the camera lens assembly according to example 3 of the present disclosure.

As shown in FIG. 5, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 7 shows surface type, radius of curvature, thickness, material and conic coefficient of each lens of the camera lens assembly in example 3, wherein the units for the radius of curvature and the thickness are millimeter (mm). Table 8 shows high-order coefficients applicable to each aspheric surface in example 3, wherein the surface shape of each aspheric surface may be defined by the formula (1) given in the above example 1. Table 9 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 3.

TABLE 7

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspheric | -1.9869 | 0.3633 | 1.54 | 55.9 | -24.9266 |
| S2 | Aspheric | 10.6286 | 0.1793 | | | -5.7858 |
| S3 | Aspheric | 1.5894 | 0.4560 | 1.64 | 23.5 | 1.7748 |
| S4 | Aspheric | 2.3460 | 0.1914 | | | 5.9324 |
| STO | Spherical | Infinite | 0.0240 | | | |
| S5 | Aspheric | 2.9032 | 0.7562 | 1.55 | 56.1 | 1.6584 |
| S6 | Aspheric | -1.8209 | 0.0552 | | | 4.1409 |
| S7 | Aspheric | -4.3912 | 0.2400 | 1.67 | 20.4 | 12.8922 |
| S8 | Aspheric | -50.0000 | 0.0470 | | | 99.0000 |
| S9 | Aspheric | -5.1830 | 0.2693 | 1.55 | 56.1 | -95.1221 |
| S10 | Aspheric | -5.9796 | 0.0600 | | | 1.6474 |
| S11 | Aspheric | -7.8248 | 0.5610 | 1.55 | 56.1 | -32.8574 |
| S12 | Aspheric | -1.3056 | 0.1524 | | | -0.2371 |
| S13 | Aspheric | 1.0044 | 0.4181 | 1.54 | 55.9 | -7.3883 |
| S14 | Aspheric | 0.6445 | 0.5362 | | | -3.1204 |
| S15 | Spherical | Infinite | 0.2100 | 1.52 | 64.2 | |
| S16 | Spherical | Infinite | 0.5268 | | | |
| S17 | Spherical | Infinite | | | | |

TABLE 7

| Surface number | A4 | A6 | A8 | A10 | A12 | A14 | A16 | A18 | A20 |
|---|---|---|---|---|---|---|---|---|---|
| S1 | 2.7658E−01 | −3.2617E−01 | 2.8764E−01 | −1.7638E−01 | 6.9181E−02 | −1.5568E−02 | 1.5116E−03 | 0.0000E+00 | 0.0000E+00 |
| S2 | 9.0502E−01 | −1.4476E+00 | 2.0548E+00 | −2.1030E+00 | 1.2957E+00 | −5.9751E−01 | 1.8188E−01 | 0.0000E+00 | 0.0000E+00 |
| S3 | 2.0015E−01 | −5.7328E−01 | 8.7122E−01 | −3.7176E−01 | −1.4890E+00 | 2.2984E+00 | −1.1146E+00 | 0.0000E+00 | 0.0000E+00 |
| S4 | 1.7228E−01 | 6.5664E−02 | −1.7065E+00 | 2.2706E+01 | −1.0943E+02 | 2.5292E+02 | −2.2046E+02 | 0.0000E+00 | 0.0000E+00 |
| S5 | 7.1806E−02 | −6.4812E−01 | 1.0255E+01 | −1.0382E+02 | 6.0617E+02 | −2.0906E+03 | 3.9511E+03 | −3.4142E+03 | 6.3718E+02 |
| S6 | −7.2069E−01 | 3.4771E+00 | −2.1355E+01 | 8.3961E+01 | −2.1129E+02 | 3.3637E+02 | −3.0277E+02 | 1.0735E+02 | 1.2649E+01 |
| S7 | −1.1088E+00 | 5.6127E+00 | −3.8777E+01 | 1.7598E+02 | −5.3498E+02 | 1.0853E+03 | −1.3806E+03 | 9.8543E+02 | −2.9905E+02 |
| S8 | −8.2444E−01 | 6.5687E+00 | −3.8455E+01 | 1.3286E+02 | −2.8161E+02 | 3.7064E+02 | −2.9154E+02 | 1.2335E+02 | −2.0961E+01 |
| S9 | −5.3862E−01 | 6.8378E+00 | −4.1168E+01 | 1.4020E+02 | −2.9220E+02 | 3.8139E+02 | −3.0457E+02 | 1.3636E+02 | −2.6305E+01 |
| S10 | −5.2492E−02 | 1.3169E+00 | −7.4091E+00 | 2.1474E+01 | −3.6778E+01 | 3.8506E+01 | −2.4316E+01 | 8.5934E+00 | −1.3273E+00 |
| S11 | −2.5667E−02 | 3.5145E−01 | −2.4985E+00 | 8.4310E+00 | −1.5417E+01 | 1.6391E+01 | −1.0125E+01 | 3.3676E+00 | −4.6767E−01 |
| S12 | −3.7907E−01 | 1.9507E+00 | −5.4068E+00 | 1.0447E+01 | −1.3183E+01 | 1.0713E+01 | −5.3665E+00 | 1.4952E+00 | −1.7625E−01 |
| S13 | −3.8418E−01 | 5.1483E−01 | −7.5228E−01 | 8.7309E−01 | −7.3622E−01 | 4.1007E−01 | −1.4015E−01 | 2.6836E−02 | −2.2387E−03 |
| S14 | −2.3637E−01 | 2.3545E−01 | −1.7895E−01 | 9.6042E−02 | −3.5680E−02 | 8.9241E−03 | −1.4268E−03 | 1.3110E−04 | −5.2495E−06 |

TABLE 9

| | |
|---|---|
| TTL (mm) | 5.05 |
| ImgH (mm) | 3.03 |
| HFOV (°) | 62.8 |
| f (mm) | 1.98 |
| f1 (mm) | −3.09 |
| f2 (mm) | 6.19 |
| f3 (mm) | 2.17 |
| f4 (mm) | −7.24 |
| f5 (mm) | −80.92 |
| f6 (mm) | 2.79 |
| f7 (mm) | −5.64 |

Figures 6A, 6B:
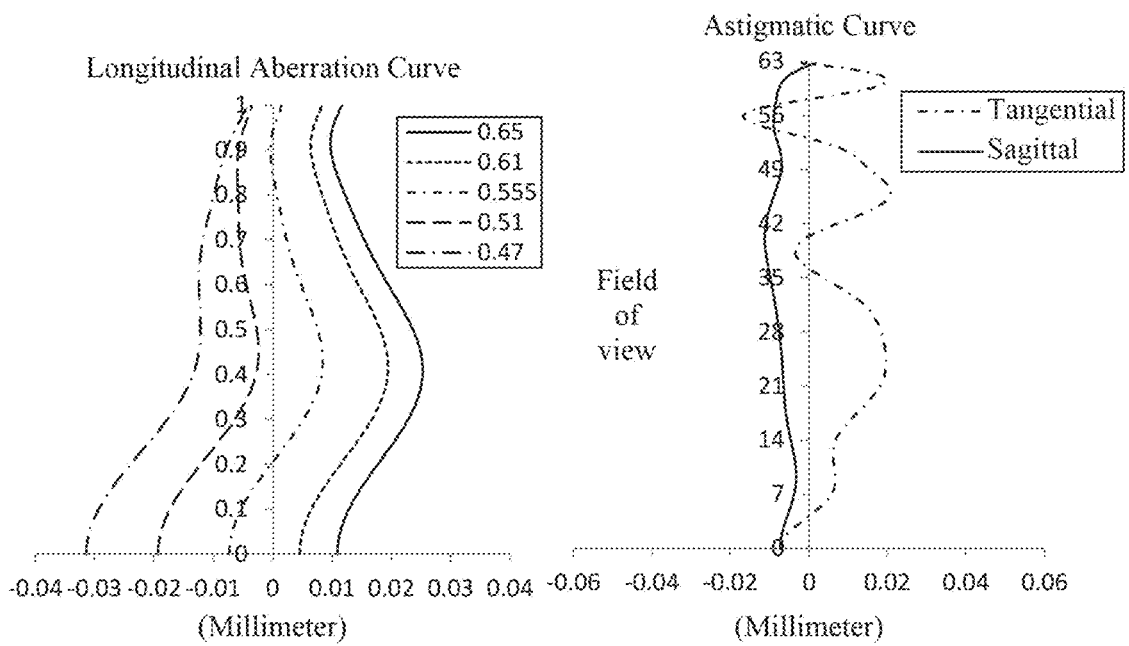
FIGS. 6A to 6D illustrate a longitudinal aberration curve, an astigmatic curve, a distortion curve, and a lateral color curve of the camera lens assembly of the Example 3, respectively.
Figure 6C:
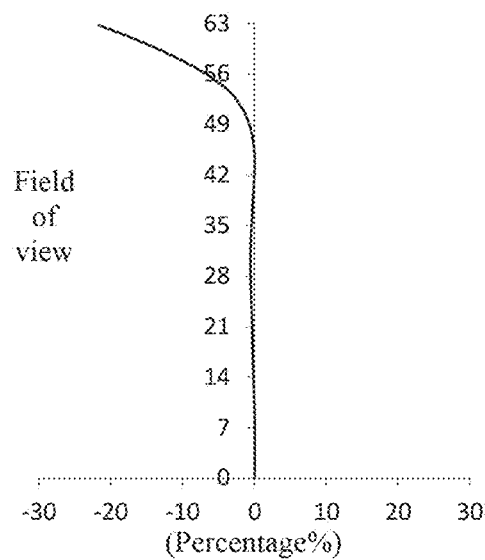
Figure 6D:
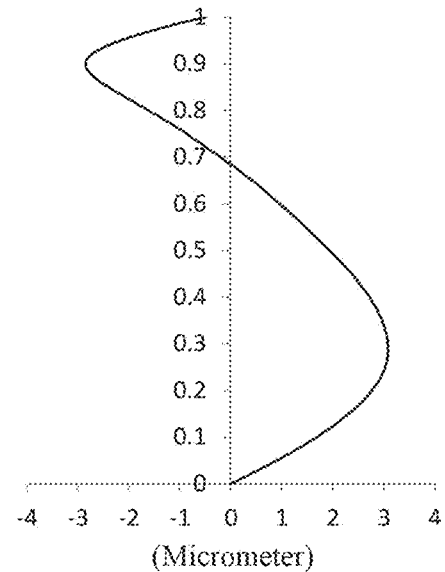

FIG. 6A illustrates a longitudinal aberration curve of the camera lens assembly according to example 3, representing deviations of focal points converged by light of different wavelengths after passing through the lens assembly. FIG. 6B illustrates an astigmatic curve of the camera lens assembly according to example 3, representing a curvature of a tangential plane and a curvature of a sagittal plane. FIG. 6C illustrates a distortion curve of the camera lens assembly according to example 3, representing amounts of distortion corresponding to different field-of-views. FIG. 6D illustrates a lateral color curve of the camera lens assembly according to example 3, representing deviations of different image heights on an imaging plane after light passes through the lens assembly. It can be seen from FIG. 6A to FIG. 6D that the camera lens assembly provided in example 3 may achieve good image quality.

Example 4

Figure 7:
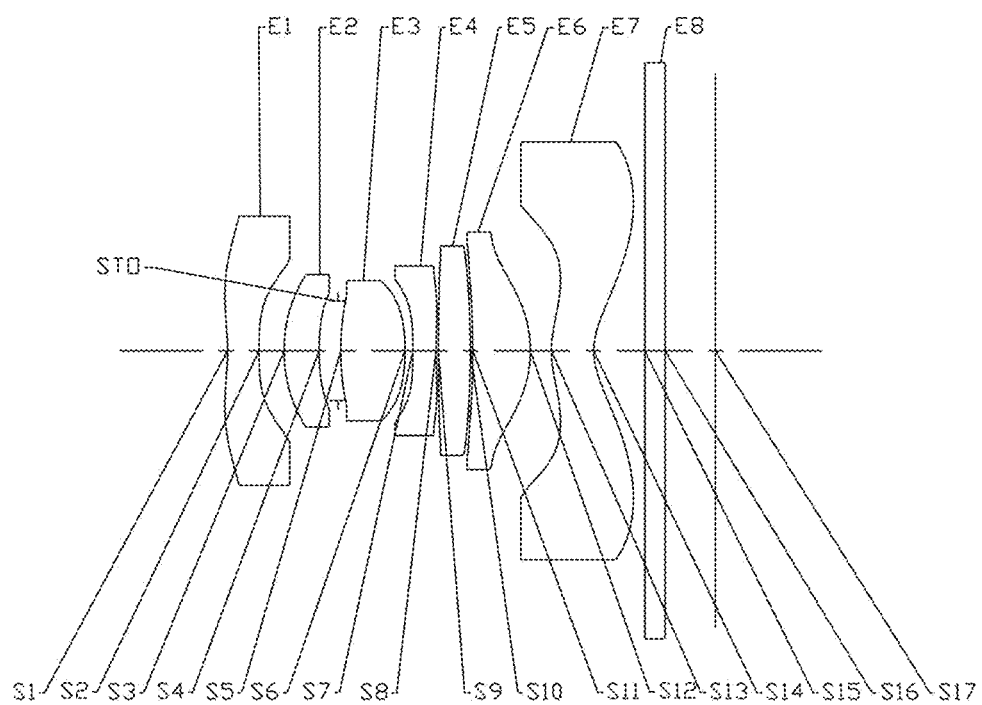
FIG. 7 illustrates a schematic structural view of a camera lens assembly according to Example 4 of the present disclosure.

A camera lens assembly according to example 4 of the present disclosure is described below with reference to FIG. 7 to FIG. 8D. FIG. 7 shows a schematic structural view of the camera lens assembly according to example 4 of the present disclosure.

As shown in FIG. 7, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 10 shows surface type, radius of curvature, thickness, material and conic coefficient of each lens of the camera lens assembly in example 4, wherein the units for the radius of curvature and the thickness are millimeter (mm). Table 11 shows high-order coefficients applicable to each aspheric surface in example 4, wherein the surface shape of each aspheric surface may be defined by the formula (1) given in the above example 1. Table 12 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 4.

TABLE 10

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | −2.2340 | 0.3265 | 1.54 | 55.9 | −31.7803 |
| S2 | Aspheric | 9.0954 | 0.2598 | | | −10.1526 |
| S3 | Aspheric | 1.7356 | 0.3630 | 1.64 | 23.5 | 1.8033 |
| S4 | Aspheric | 2.5651 | 0.1962 | | | 5.3107 |
| STO | Spherical | Infinite | 0.0286 | | | |
| S5 | Aspheric | 2.9653 | 0.6663 | 1.55 | 56.1 | 3.6302 |
| S6 | Aspheric | −2.2387 | 0.0817 | | | 4.3228 |
| S7 | Aspheric | −10.3545 | 0.2400 | 1.67 | 20.4 | 13.7267 |
| S8 | Aspheric | 3.6311 | 0.0240 | | | −46.2958 |

TABLE 10-continued

| Surface number | Surface type | Radius of curvature | Thickness | Material Refractive index | Abbe number | Conic coefficient |
|---|---|---|---|---|---|---|
| S9 | Aspheric | 10.0023 | 0.3332 | 1.55 | 56.1 | −90.2094 |
| S10 | Aspheric | −7.0724 | 0.0240 | | | −8.0255 |
| S11 | Aspheric | −9.9467 | 0.5972 | 1.55 | 56.1 | −9.0382 |
| S12 | Aspheric | −1.3696 | 0.2185 | | | −0.2107 |
| S13 | Aspheric | 1.0536 | 0.4391 | 1.54 | 55.9 | −8.1903 |
| S14 | Aspheric | 0.6641 | 0.5304 | | | −3.3031 |
| S15 | Spherical | Infinite | 0.2100 | 1.52 | 64.2 | |
| S16 | Spherical | Infinite | 0.5210 | | | |
| S17 | Spherical | Infinite | | | | |

TABLE 11

| Surface number | A4 | A6 | A8 | A10 | A12 | A14 | A16 | A18 | A20 |
|---|---|---|---|---|---|---|---|---|---|
| S1 | 3.3018E−01 | −3.9318E−01 | 3.6035E−01 | −2.3922E−01 | 1.0400E−01 | −2.6397E−02 | 2.9349E−03 | 0.0000E+00 | 0.0000E+00 |
| S2 | 8.8564E−01 | −1.2483E+00 | 1.7322E+00 | −1.7359E+00 | 6.6952E−01 | −7.1862E−02 | 6.7738E−02 | 0.0000E+00 | 0.0000E+00 |
| S3 | 1.7252E−01 | −5.3163E−01 | 1.4965E+00 | −3.9079E+00 | 6.3074E+00 | −6.7429E+00 | 3.7391E+00 | 0.0000E+00 | 0.0000E+00 |
| S4 | 1.8730E−01 | −3.5458E−01 | 3.9152E+00 | −2.2120E+01 | 7.6630E+01 | −1.4360E+02 | 1.2457E+02 | 0.0000E+00 | 0.0000E+00 |
| S5 | 7.7261E−02 | −8.4726E−01 | 1.3147E+01 | −1.2887E+02 | 7.6142E+02 | −2.7780E+03 | 6.0782E+03 | −7.3079E+03 | 3.7131E+03 |
| S6 | −4.2038E−01 | 2.3807E−01 | 1.6974E+00 | −2.1787E+01 | 9.9963E+01 | −2.5729E+02 | 4.0535E+02 | −3.7063E+02 | 1.5030E+02 |
| S7 | −8.8296E−01 | 2.4358E+00 | −1.5204E+01 | 8.0070E+01 | −3.0503E+02 | 7.6508E+02 | −1.1613E+03 | 9.6309E+02 | −3.3454E+02 |
| S8 | −7.1340E−01 | 3.3533E+00 | −1.4096E+01 | 4.0351E+01 | −7.7191E+01 | 9.8919E+01 | −8.1088E+01 | 3.8189E+01 | −7.7928E+00 |
| S9 | −3.4358E−01 | 2.8650E+00 | −1.3557E+01 | 3.8494E+01 | −6.9348E+01 | 8.0589E+01 | −5.8712E+01 | 2.4457E+01 | −4.4630E+00 |
| S10 | −3.0679E−03 | 8.7017E−01 | −5.4842E+00 | 1.7129E+01 | −3.1489E+01 | 3.5476E+01 | −2.4191E+01 | 9.2281E+00 | −1.5225E+00 |
| S11 | −5.0945E−02 | 6.1023E−01 | −3.9955E+00 | 1.3298E+01 | −2.4842E+01 | 2.7550E+01 | −1.8068E+01 | 6.4898E+00 | −9.8817E−01 |
| S12 | −3.6632E−01 | 1.7185E+00 | −4.5568E+00 | 8.4167E+00 | −1.0132E+01 | 7.8265E+00 | −3.7043E+00 | 9.6584E−01 | −1.0496E−01 |
| S13 | −3.6346E−01 | 3.6218E−01 | −3.3016E−01 | 1.6055E−01 | 2.2450E−02 | −1.0247E−01 | 7.0446E−02 | −2.0675E−02 | 2.2460E−03 |
| S14 | −2.2213E−01 | 2.2186E−01 | −1.6899E−01 | 9.0260E−02 | −3.3196E−02 | 8.1791E−03 | −1.2832E−03 | 1.1541E−04 | −4.5174E−06 |

TABLE 12

| | |
|---|---|
| TTL (mm) | 5.06 |
| ImgH (mm) | 3.03 |
| HFOV (°) | 62.7 |
| f (mm) | 2.03 |
| f1 (mm) | −3.31 |
| f2 (mm) | 7.11 |
| f3 (mm) | 2.45 |
| f4 (mm) | −4.01 |
| f5 (mm) | 7.64 |
| f6 (mm) | 2.84 |
| f7 (mm) | −5.52 |

Figure 8A:
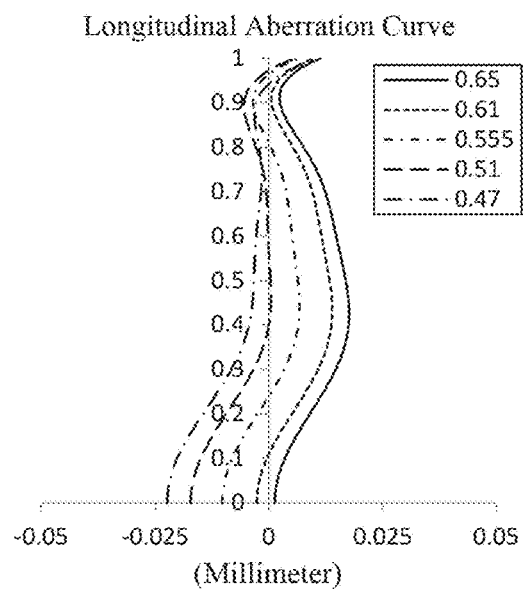
FIGS. 8A to 8D illustrate a longitudinal aberration curve, an astigmatic curve, a distortion curve, and a lateral color curve of the camera lens assembly of the Example 4, respectively.
Figure 8B:
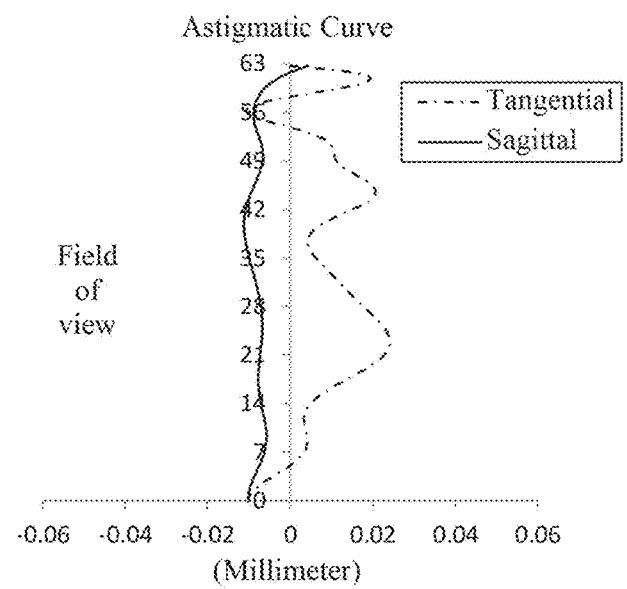
Figure 8C:
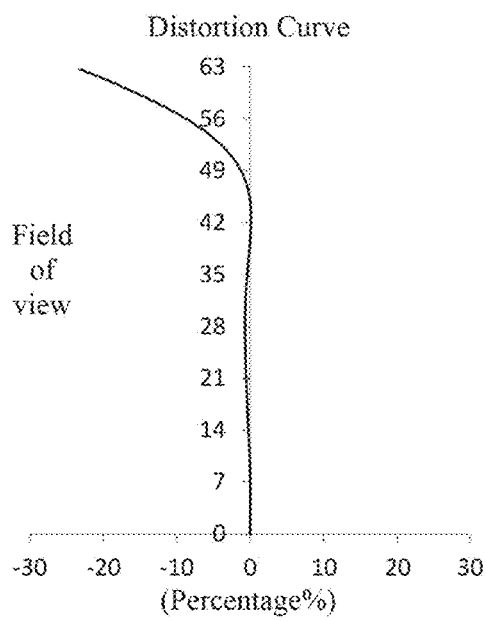
Figure 8D:
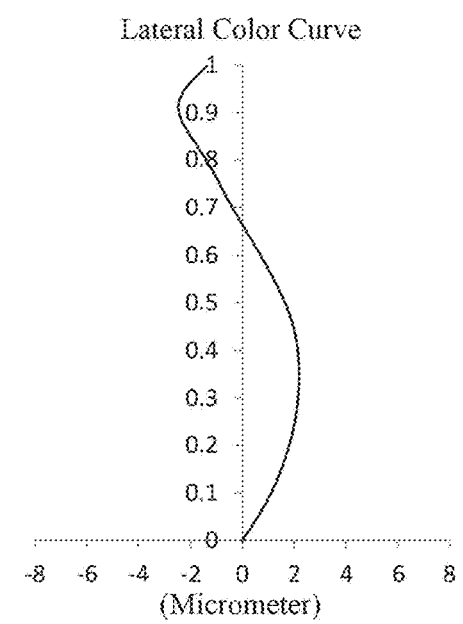

FIG. 8A illustrates a longitudinal aberration curve of the camera lens assembly according to example 4, representing deviations of focal points converged by light of different wavelengths after passing through the lens assembly. FIG. 8B illustrates an astigmatic curve of the camera lens assembly according to example 4, representing a curvature of a tangential plane and a curvature of a sagittal plane. FIG. 8C illustrates a distortion curve of the camera lens assembly according to example 4, representing amounts of distortion corresponding to different field-of-views. FIG. 8D illustrates a lateral color curve of the camera lens assembly according to example 4, representing deviations of different image heights on an imaging plane after light passes through the lens assembly. It can be seen from FIG. 8A to FIG. 8D that the camera lens assembly provided in example 4 may achieve good image quality.

Example 5

Figure 9:
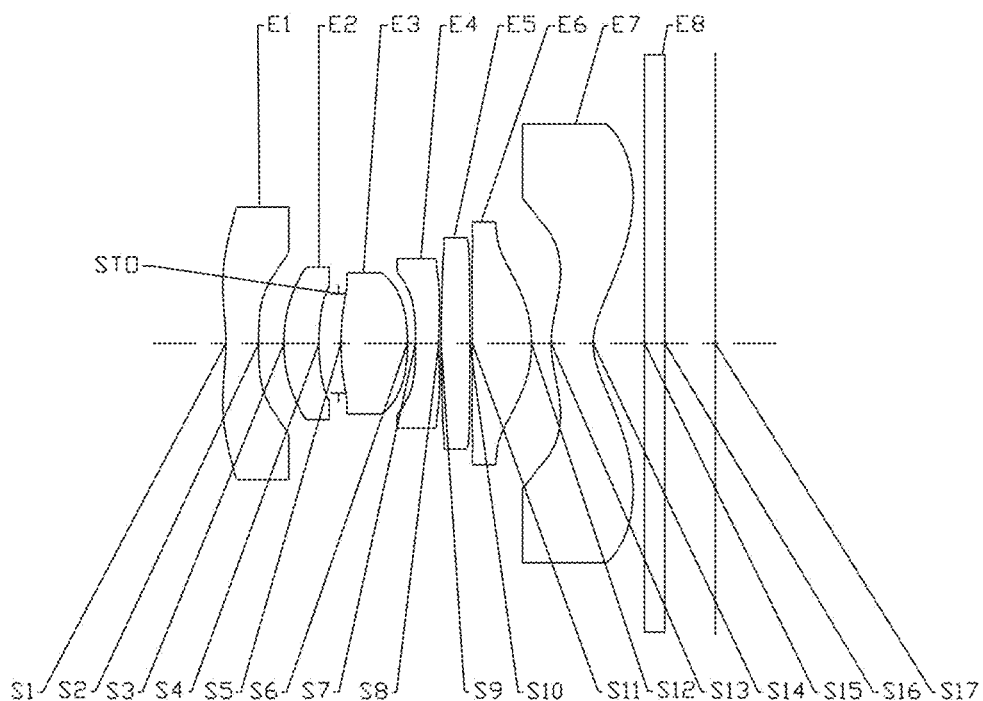
FIG. 9 illustrates a schematic structural view of a camera lens assembly according to Example 5 of the present disclosure.

A camera lens assembly according to example 5 of the present disclosure is described below with reference to FIG. 9 to FIG. 10D. FIG. 9 shows a schematic structural view of the camera lens assembly according to example 5 of the present disclosure.

As shown in FIG. 9, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 13 shows surface type, radius of curvature, thickness, material and conic coefficient of each lens of the camera lens assembly in example 5, wherein the units for the radius of curvature and the thickness are millimeter (mm). Table 14 shows high-order coefficients applicable to each aspheric surface in example 5, wherein the surface shape of each aspheric surface may be defined by the formula (1) given in the above example 1. Table 15 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 5.

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −2.1463 | 0.3379 | 1.54 | 55.9 | −29.0305 |
| S2 | Aspheric | 10.0418 | 0.2611 | | | −8.5105 |
| S3 | Aspheric | 1.7214 | 0.3624 | 1.64 | 23.5 | 1.7631 |
| S4 | Aspheric | 2.5396 | 0.2015 | | | 5.3744 |
| STO | Spherical | Infinite | 0.0260 | | | |
| S5 | Aspheric | 2.8664 | 0.6870 | 1.55 | 56.1 | 3.2914 |
| S6 | Aspheric | −2.1901 | 0.0831 | | | 4.2771 |
| S7 | Aspheric | −9.8850 | 0.2400 | 1.67 | 20.4 | 30.8068 |
| S8 | Aspheric | 3.4721 | 0.0240 | | | −50.7562 |
| S9 | Aspheric | 8.4208 | 0.2977 | 1.55 | 56.1 | −93.7464 |
| S10 | Aspheric | −25.0000 | 0.0240 | | | 99.0000 |
| S11 | Aspheric | 1046.2120 | 0.6122 | 1.55 | 56.1 | 99.0000 |
| S12 | Aspheric | −1.4034 | 0.2029 | | | −0.2129 |
| S13 | Aspheric | 1.0331 | 0.4345 | 1.54 | 55.9 | −7.7649 |
| S14 | Aspheric | 0.6594 | 0.5306 | | | −3.2611 |
| S15 | Spherical | Infinite | 0.2100 | 1.52 | 64.2 | |
| S16 | Spherical | Infinite | 0.5212 | | | |
| S17 | Spherical | Infinite | | | | |

TABLE 14

| Surface number | A4 | A6 | A8 | A10 | A12 | A14 | A16 | A18 | A20 |
|---|---|---|---|---|---|---|---|---|---|
| S1 | 3.1626E−01 | −3.7188E−01 | 3.3537E−01 | −2.1851E−01 | 9.3190E−02 | −2.3146E−02 | 2.5117E−03 | 0.0000E+00 | 0.0000E+00 |
| S2 | 8.2226E−01 | −1.2743E+00 | 1.8833E+00 | −2.1910E+00 | 1.3939E+00 | −6.1189E−01 | 2.1574E−01 | 0.0000E+00 | 0.0000E+00 |
| S3 | 1.8156E−01 | −5.2039E−01 | 1.3045E+00 | −3.0845E+00 | 4.4818E+00 | −4.8120E+00 | 2.9133E+00 | 0.0000E+00 | 0.0000E+00 |
| S4 | 2.0253E−01 | −4.5635E−01 | 4.5862E+00 | −2.4602E+01 | 7.9314E+01 | −1.3931E+02 | 1.1259E+02 | 0.0000E+00 | 0.0000E+00 |
| S5 | 7.4618E−02 | −7.0211E−01 | 1.0754E+01 | −1.0584E+02 | 6.1869E+02 | −2.2102E+03 | 4.6628E+03 | −5.2985E+03 | 2.4682E+03 |
| S6 | −4.0823E−01 | 1.0354E−01 | 3.5011E+00 | −3.4432E+01 | 1.5448E+02 | −4.0293E+02 | 6.3384E+02 | −5.6011E+02 | 2.1227E+02 |
| S7 | −8.7301E−01 | 1.9589E+00 | −8.9576E+00 | 3.6682E+01 | −1.2017E+02 | 2.7454E+02 | −3.7984E+02 | 2.8248E+02 | −8.6179E+01 |
| S8 | −7.0709E−01 | 3.1898E+00 | −1.2893E+01 | 3.4687E+01 | −5.9117E+01 | 6.2107E+01 | −3.6501E+01 | 9.2533E+00 | −7.9157E−02 |
| S9 | −3.4804E−01 | 2.9741E+00 | −1.4488E+01 | 4.2268E+01 | −7.7601E+01 | 9.0728E+01 | −6.5536E+01 | 2.6699E+01 | −4.7107E+00 |
| S10 | −1.1446E−02 | 9.2921E−01 | −5.7487E+00 | 1.7724E+01 | −3.2211E+01 | 3.5897E+01 | −2.4223E+01 | 9.1477E+00 | −1.4958E+00 |
| S11 | −4.6715E−02 | 5.5820E−01 | −3.7376E+00 | 1.2612E+01 | −2.3782E+01 | 2.6602E+01 | −1.7616E+01 | 6.4058E+00 | −9.9136E−01 |
| S12 | −3.7257E−01 | 1.7871E+00 | −4.7820E+00 | 8.8995E+00 | −1.0798E+01 | 8.4156E+00 | −4.0272E+00 | 1.0651E+00 | −1.1805E−01 |
| S13 | −3.8718E−01 | 4.5762E−01 | −5.8676E−01 | 5.8348E−01 | −4.1175E−01 | 1.7381E−01 | −3.4712E−02 | 1.2524E−03 | 3.1313E−04 |
| S14 | −2.2741E−01 | 2.2745E−01 | −1.7318E−01 | 9.2626E−02 | −3.4219E−02 | 8.4998E−03 | −1.3485E−03 | 1.2291E−04 | −4.8815E−06 |

TABLE 15

| | |
|---|---|
| TTL (mm) | 5.06 |
| ImgH (mm) | 3.03 |
| HFOV (°) | 62.6 |
| f (mm) | 2.01 |
| f1 (mm) | −3.26 |
| f2 (mm) | 7.06 |
| f3 (mm) | 2.39 |
| f4 (mm) | −3.83 |
| f5 (mm) | 11.57 |
| f6 (mm) | 2.57 |
| f7 (mm) | −5.72 |

Figure 10A:
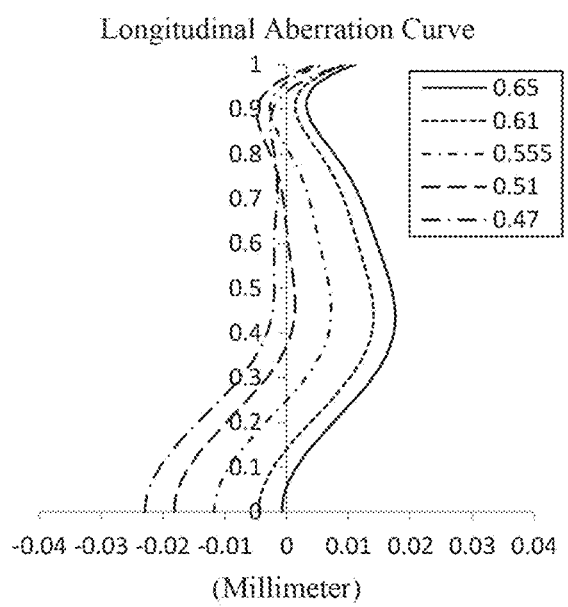
FIGS. 10A to 10D illustrate a longitudinal aberration curve, an astigmatic curve, a distortion curve, and a lateral color curve of the camera lens assembly of the Example 5, respectively.
Figure 10B:
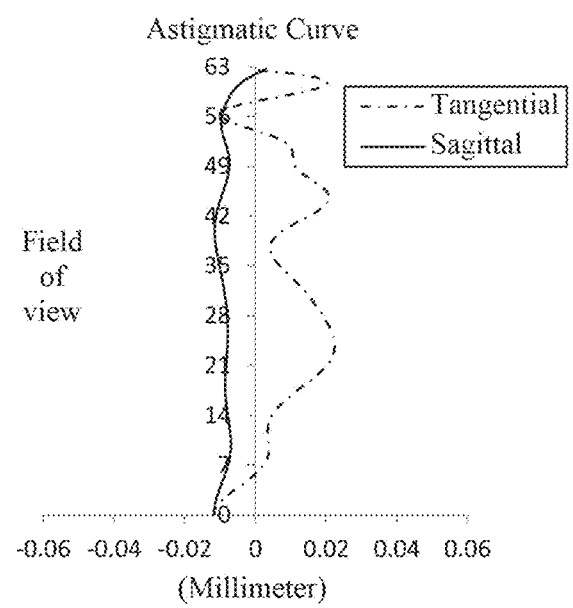
Figure 10C:
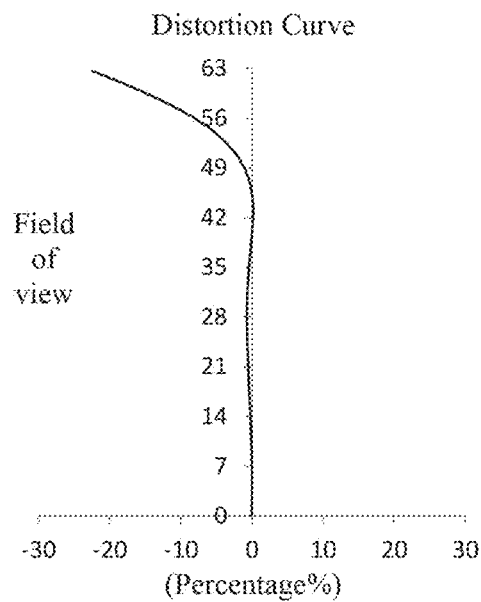
Figure 10D:
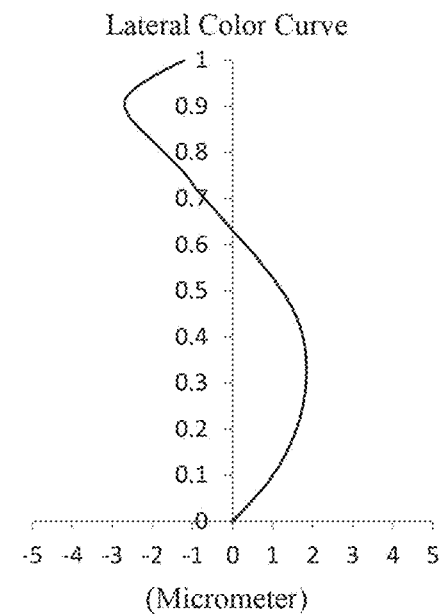

FIG. 10A illustrates a longitudinal aberration curve of the camera lens assembly according to example 5, representing deviations of focal points converged by light of different wavelengths after passing through the lens assembly. FIG. 10B illustrates an astigmatic curve of the camera lens assembly according to example 5, representing a curvature of a tangential plane and a curvature of a sagittal plane. FIG. 10C illustrates a distortion curve of the camera lens assembly according to example 5, representing amounts of distortion corresponding to different field-of-views. FIG. 10D illustrates a lateral color curve of the camera lens assembly according to example 5, representing deviations of different image heights on an imaging plane after light passes through the lens assembly. It can be seen from FIG. 10A to FIG. 10D that the camera lens assembly provided in example 5 may achieve good image quality.

Example 6

Figure 11:
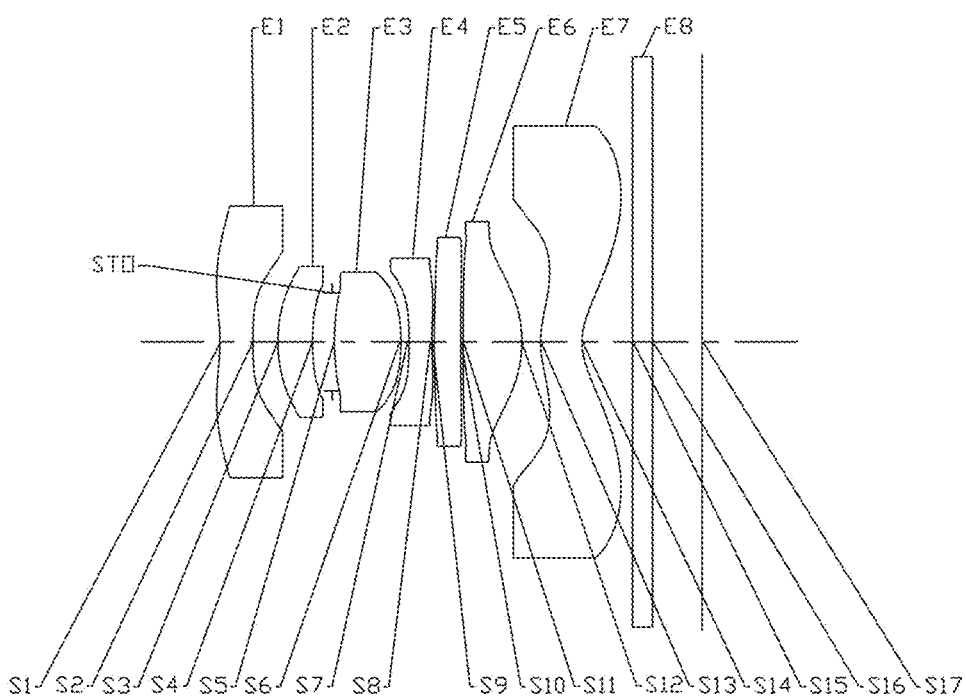
FIG. 11 illustrates a schematic structural view of a camera lens assembly according to Example 6 of the present disclosure.

A camera lens assembly according to example 6 of the present disclosure is described below with reference to FIG. 11 to FIG. 12D. FIG. 11 shows a schematic structural view of the camera lens assembly according to example 6 of the present disclosure.

As shown in FIG. 11, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 16 shows surface type, radius of curvature, thickness, material and conic coefficient of each lens of the camera lens assembly in example 6, wherein the units for the radius of curvature and the thickness are millimeter (mm). Table 17 shows high-order coefficients applicable to each aspheric surface in example 6, wherein the surface shape of each aspheric surface may be defined by the formula (1) given in the above example 1. Table 18 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 6.

TABLE 16

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −2.0932 | 0.3462 | 1.54 | 55.9 | −27.5657 |
| S2 | Aspheric | 10.7872 | 0.2631 | | | −6.8069 |
| S3 | Aspheric | 1.7157 | 0.3611 | 1.64 | 23.5 | 1.7303 |
| S4 | Aspheric | 2.5236 | 0.2064 | | | 5.3277 |
| STO | Spherical | Infinite | 0.0240 | | | |
| S5 | Aspheric | 2.8043 | 0.6976 | 1.55 | 56.1 | 2.9617 |
| S6 | Aspheric | −2.1535 | 0.0839 | | | 4.2530 |
| S7 | Aspheric | −9.4889 | 0.2400 | 1.67 | 20.4 | 39.2989 |
| S8 | Aspheric | 3.4066 | 0.0240 | | | −53.1769 |
| S9 | Aspheric | 7.7682 | 0.2784 | 1.55 | 56.1 | −99.0000 |
| S10 | Aspheric | 1408.4070 | 0.0240 | | | −99.0000 |
| S11 | Aspheric | 24.3827 | 0.6167 | 1.55 | 56.1 | 46.3515 |
| S12 | Aspheric | −1.4222 | 0.1963 | | | −0.2149 |
| S13 | Aspheric | 1.0325 | 0.4339 | 1.54 | 55.9 | −7.6486 |
| S14 | Aspheric | 0.6614 | 0.5289 | | | −3.2466 |
| S15 | Spherical | Infinite | 0.2100 | 1.52 | 64.2 | |
| S16 | Spherical | Infinite | 0.5195 | | | |
| S17 | Spherical | Infinite | | | | |

TABLE 17

| Surface number | A4 | A6 | A8 | A10 | A12 | A14 | A16 | A18 | A20 |
|---|---|---|---|---|---|---|---|---|---|
| S1 | 3.1024E−01 | −3.6216E−01 | 3.2253E−01 | −2.0676E−01 | 8.6709E−02 | −2.1148E−02 | 2.2493E−03 | 0.0000E+00 | 0.0000E+00 |
| S2 | 8.8762E−01 | −1.2956E+00 | 1.9462E+00 | −2.3711E+00 | 1.6803E+00 | −8.0765E−01 | 2.5747E−01 | 0.0000E+00 | 0.0000E+00 |
| S3 | 1.9081E−01 | −5.2936E−01 | 1.2018E+00 | −2.5406E+00 | 3.1119E+00 | −3.0957E+00 | 2.0272E+00 | 0.0000E+00 | 0.0000E+00 |
| S4 | 2.1034E−01 | −4.8553E−01 | 4.4530E+00 | −2.2348E+01 | 6.6781E+01 | −1.0852E+02 | 8.2619E+01 | 0.0000E+00 | 0.0000E+00 |
| S5 | 7.2992E−02 | −6.4547E−01 | 9.8682E+00 | −9.8060E+01 | 5.7269E+02 | −2.0267E+03 | 4.1776E+03 | −4.5383E+03 | 1.9383E+03 |
| S6 | −3.9771E−01 | −8.2368E−02 | 5.5490E+00 | −4.7083E+01 | 2.0364E+02 | −5.2488E+02 | 8.1922E+02 | −7.1607E+02 | 2.6719E+02 |
| S7 | −8.6496E−01 | 1.6898E+00 | −5.9299E+00 | 1.7681E+01 | −4.4459E+01 | 8.0440E+01 | −7.3818E+01 | 1.4877E+01 | 1.2576E+01 |
| S8 | −7.0335E−01 | 3.1055E+00 | −1.2440E+01 | 3.3226E+01 | −5.5412E+01 | 5.4715E+01 | −2.6810E+01 | 2.3529E+00 | 1.9082E+00 |
| S9 | −3.5306E−01 | 3.0566E+00 | −1.5171E+01 | 4.5234E+01 | −8.4914E+01 | 1.0131E+02 | −7.4419E+01 | 3.0699E+01 | −5.4564E+00 |
| S10 | −1.6431E−02 | 9.7025E−01 | −5.9717E+00 | 1.8349E+01 | −3.3239E+01 | 3.6917E+01 | −2.4808E+01 | 9.3152E+00 | −1.5115E+00 |
| S11 | −4.5787E−02 | 5.4324E−01 | −3.6740E+00 | 1.2504E+01 | −2.3761E+01 | 2.6799E+01 | −1.7912E+01 | 6.5816E+00 | −1.0301E+00 |
| S12 | −3.7462E−01 | 1.8133E+00 | −4.8661E+00 | 9.0777E+00 | −1.1041E+01 | 8.6308E+00 | −4.1454E+00 | 1.1016E+00 | −1.2294E−01 |
| S13 | −4.0112E−01 | 5.1166E−01 | −7.4008E−01 | 8.5001E−01 | −6.9935E−01 | 3.6607E−01 | −1.1173E−01 | 1.8197E−02 | −1.2652E−03 |
| S14 | −2.3136E−01 | 2.3154E−01 | −1.7612E−01 | 9.4294E−02 | −3.4965E−02 | 8.7411E−03 | −1.3985E−03 | 1.2868E−04 | −5.1619E−06 |

TABLE 18

| TTL (mm) | 5.05 |
|---|---|
| ImgH (mm) | 3.03 |
| HFOV (°) | 62.5 |
| f (mm) | 2.00 |
| f1 (mm) | −3.24 |
| f2 (mm) | 7.08 |
| f3 (mm) | 2.35 |
| f4 (mm) | −3.73 |
| f5 (mm) | 14.31 |
| f6 (mm) | 2.48 |
| f7 (mm) | −5.79 |

Figure 12A:
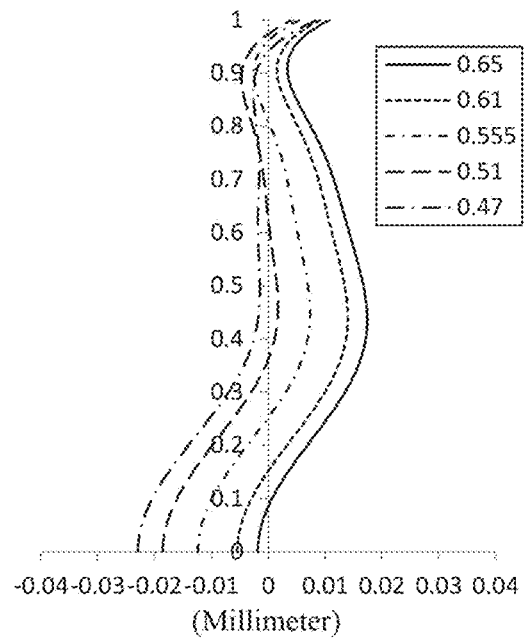
FIGS. 12A to 12D illustrate a longitudinal aberration curve, an astigmatic curve, a distortion curve, and a lateral color curve of the camera lens assembly of the Example 6, respectively.
Figure 12B:
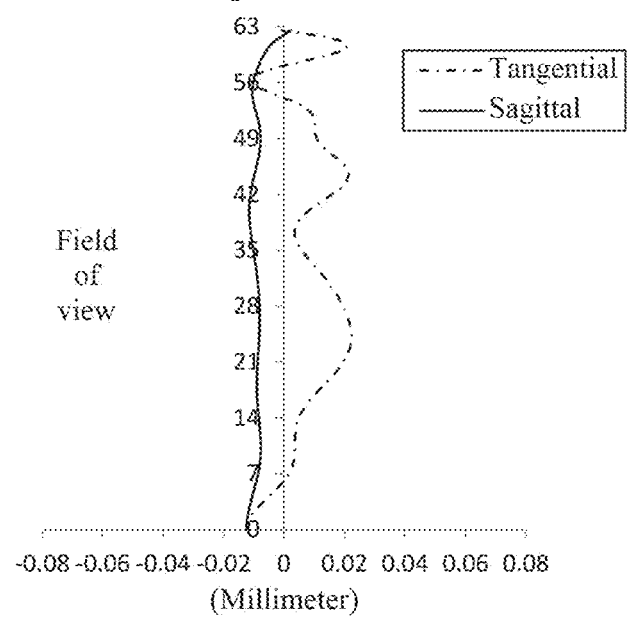
Figure 12C:
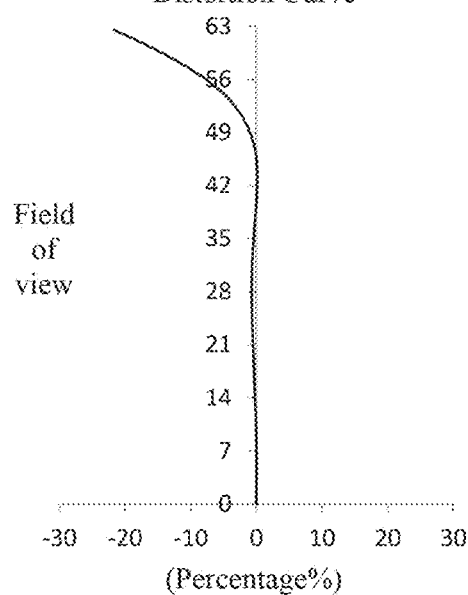
Figure 12D:
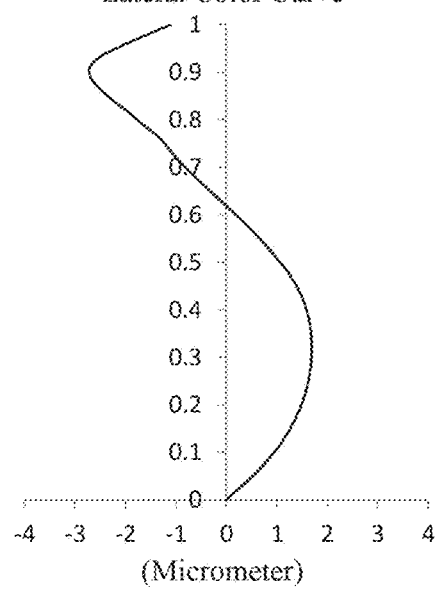

FIG. 12A illustrates a longitudinal aberration curve of the camera lens assembly according to example 6, representing deviations of focal points converged by light of different wavelengths after passing through the lens assembly. FIG. 12B illustrates an astigmatic curve of the camera lens assembly according to example 6, representing a curvature of a tangential plane and a curvature of a sagittal plane. FIG. 12C illustrates a distortion curve of the camera lens assembly according to example 6, representing amounts of distortion corresponding to different field-of-views. FIG. 12D illustrates a lateral color curve of the camera lens assembly according to example 6, representing deviations of different image heights on an imaging plane after light passes through the lens assembly. It can be seen from FIG. 12A to FIG. 12D that the camera lens assembly provided in example 6 may achieve good image quality.

Example 7

Figure 13:
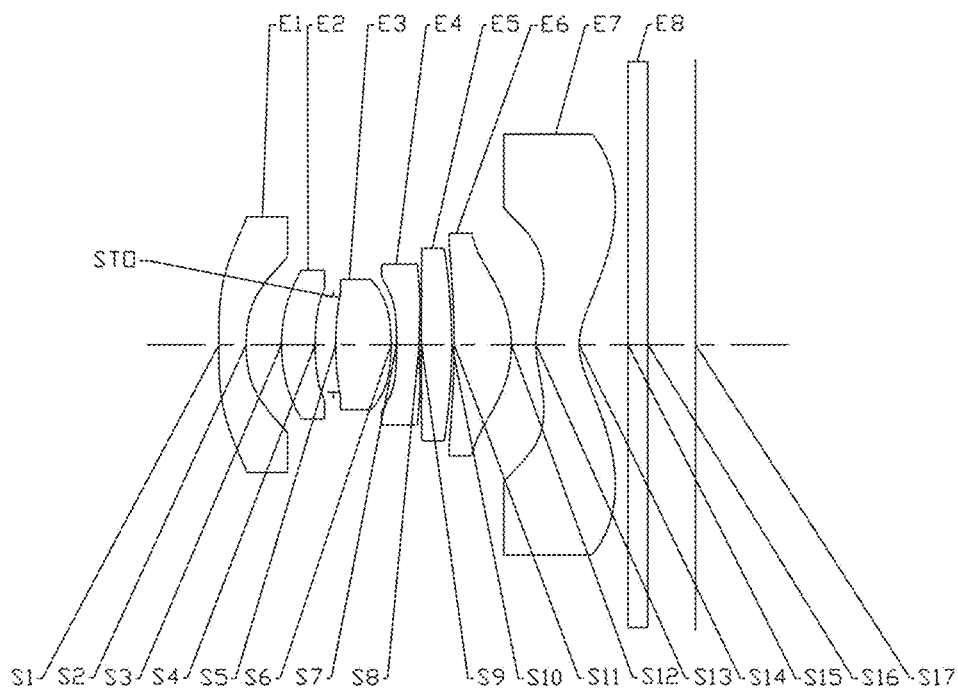
FIG. 13 illustrates a schematic structural view of a camera lens assembly according to Example 7 of the present disclosure.

A camera lens assembly according to example 7 of the present disclosure is described below with reference to FIG. 13 to FIG. 14D. FIG. 13 shows a schematic structural view of the camera lens assembly according to example 7 of the present disclosure.

As shown in FIG. 13, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16.

Light from an object sequentially passes through the respective surfaces S1 to S16 and is finally imaged on the imaging plane S17.

Table 19 shows surface type, radius of curvature, thickness, material and conic coefficient of each lens of the camera lens assembly in example 7, wherein the units for the radius of curvature and the thickness are millimeter (mm). Table 20 shows high-order coefficients applicable to each aspheric surface in example 7, wherein the surface shape of each aspheric surface may be defined by the formula (1) given in the above example 1. Table 21 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 7.

TABLE 19

| Surface number | Surface type | Radius of curvature | Thickness | Material Refractive index | Abbe number | Conic coefficient |
| --- | --- | --- | --- | --- | --- | --- |
| OBJ | Spherical | Infinite | Infinite | | | |
| S1 | Aspheric | 73.9158 | 0.2876 | 1.54 | 55.9 | −99.0000 |
| S2 | Aspheric | 1.7728 | 0.3750 | | | −11.7795 |
| S3 | Aspheric | 1.7745 | 0.3557 | 1.64 | 23.5 | 1.7661 |
| S4 | Aspheric | 2.6913 | 0.1934 | | | 6.2316 |
| STO | Spherical | Infinite | 0.0240 | | | |
| S5 | Aspheric | 3.2472 | 0.5872 | 1.55 | 56.1 | 3.7402 |
| S6 | Aspheric | −2.2793 | 0.0570 | | | 5.0419 |
| S7 | Aspheric | −12.5526 | 0.2400 | 1.67 | 20.4 | −58.2948 |
| S8 | Aspheric | 3.6875 | 0.0240 | | | −38.2447 |
| S9 | Aspheric | 18.3738 | 0.3205 | 1.55 | 56.1 | −68.9834 |
| S10 | Aspheric | −5.5026 | 0.0252 | | | −5.9188 |
| S11 | Aspheric | −10.9264 | 0.6064 | 1.55 | 56.1 | 9.8828 |
| S12 | Aspheric | −1.3628 | 0.2602 | | | −0.2112 |
| S13 | Aspheric | 1.0531 | 0.4579 | 1.54 | 55.9 | −9.1674 |
| S14 | Aspheric | 0.6561 | 0.5159 | | | −3.6607 |
| S15 | Spherical | Infinite | 0.2100 | 1.52 | 64.2 | |
| S16 | Spherical | Infinite | 0.5064 | | | |
| S17 | Spherical | Infinite | | | | |

TABLE 20

| Surface number | A4 | A6 | A8 | A10 | A12 | A14 | A16 | A18 | A20 |
| --- | --- | --- | --- | --- | --- | --- | --- | --- | --- |
| S1 | 3.3317E−01 | −4.1427E−01 | 4.5804E−01 | −4.0422E−01 | 2.3304E−01 | −7.4922E−02 | 1.0028E−02 | 0.0000E+00 | 0.0000E+00 |
| S2 | 9.4396E−01 | −2.0492E+00 | 6.4658E+00 | −1.4347E+01 | 1.8013E+01 | −1.2251E+01 | 3.5404E+00 | 0.0000E+00 | 0.0000E+00 |
| S3 | 1.2504E−01 | −4.3045E−01 | 1.7936E+00 | −6.1255E+00 | 1.0612E+01 | −9.5719E+00 | 4.0063E+00 | 0.0000E+00 | 0.0000E+00 |
| S4 | 1.6933E−01 | 6.0831E−01 | −6.8734E+00 | 4.2288E+01 | −1.4848E+02 | 2.8772E+02 | −2.1653E+02 | 0.0000E+00 | 0.0000E+00 |
| S5 | 1.0165E−01 | −1.3515E+00 | 2.5958E+01 | −3.2724E+02 | 2.5445E+03 | −1.2306E+04 | 3.5864E+04 | −5.7555E+04 | 3.9011E+04 |
| S6 | −3.7840E−01 | −2.3538E+00 | 3.4702E+00 | −2.3478E+02 | 8.7333E+02 | −1.8748E+03 | 2.2583E+03 | −1.3346E+03 | 2.5001E+02 |
| S7 | −9.4799E−01 | 2.7176E+00 | −1.8713E+01 | 1.4076E+02 | −7.6638E+02 | 2.5329E+03 | −4.8153E+03 | 4.8763E+03 | −2.0422E+03 |
| S8 | −7.0165E−01 | 3.0253E+00 | −1.1102E+01 | 2.8843E+01 | −5.5382E+01 | 8.0562E+01 | −8.1023E+01 | 4.7667E+01 | −1.1922E+01 |
| S9 | −3.2907E−01 | 2.6944E+00 | −1.2718E+01 | 3.5815E+01 | −6.2403E+01 | 6.6949E+01 | −4.1345E+01 | 1.2130E+01 | −8.1155E−01 |
| S10 | −6.7417E−03 | 6.5024E−01 | −3.8084E+00 | 1.0825E+01 | −1.7150E+01 | 1.5179E+01 | −6.8329E+00 | 1.0597E+00 | 9.6064E−02 |
| S11 | −3.8396E−02 | 3.0453E−01 | −1.7683E+00 | 5.3474E+00 | −8.2884E+00 | 6.2193E+00 | −1.2379E+00 | −9.7673E−01 | 4.3909E−01 |
| S12 | −3.6353E−01 | 1.6524E+00 | −4.3639E+00 | 8.1767E+00 | −1.0116E+01 | 8.0544E+00 | −3.8895E+00 | 1.0087E+00 | −1.0360E−01 |
| S13 | −3.7629E−01 | 2.4213E−01 | 1.4093E−01 | −7.3925E−01 | 1.0066E+00 | −7.4998E−01 | 3.2352E−01 | −7.4536E−02 | 7.0295E−03 |
| S14 | −2.2321E−01 | 2.4342E−01 | −2.0580E−01 | 1.2104E−01 | −4.8353E−02 | 1.2769E−02 | −2.1230E−03 | 2.0049E−04 | −8.1762E−06 |

TABLE 21

| TTL (mm) | 5.05 |
| --- | --- |
| ImgH (mm) | 3.03 |
| HFOV (°) | 62.2 |
| f (mm) | 2.00 |
| f1 (mm) | −3.39 |
| f2 (mm) | 7.01 |

TABLE 21-continued

| f3 (mm) | 2.55 |
| --- | --- |
| f4 (mm) | −4.25 |
| f5 (mm) | 7.79 |
| f6 (mm) | 2.79 |
| f7 (mm) | −5.43 |

Figure 14A:
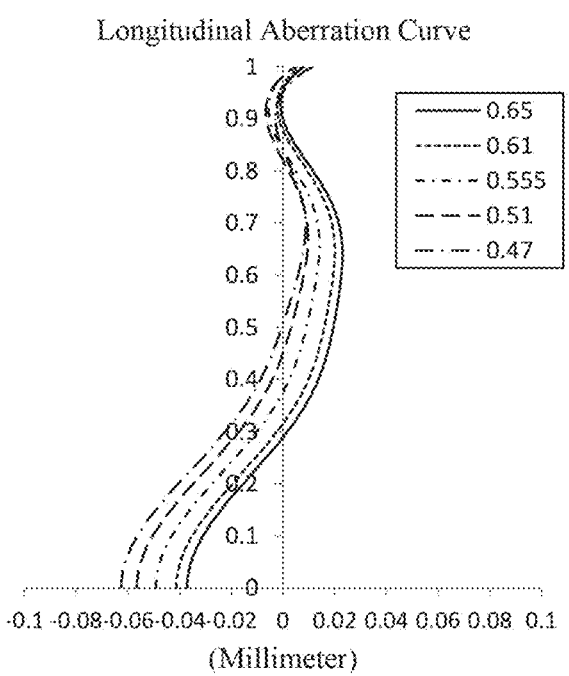
FIGS. 14A to 14D illustrate a longitudinal aberration curve, an astigmatic curve, a distortion curve, and a lateral color curve of the camera lens assembly of the Example 7, respectively.
Figure 14B:
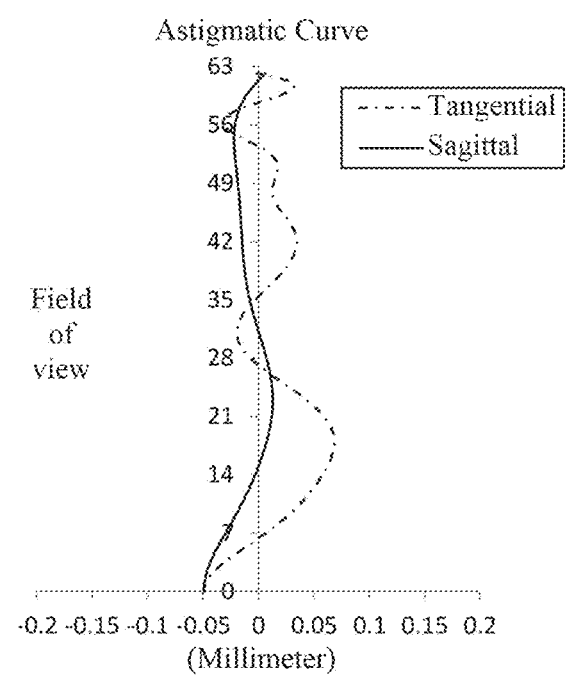
Figure 14C:
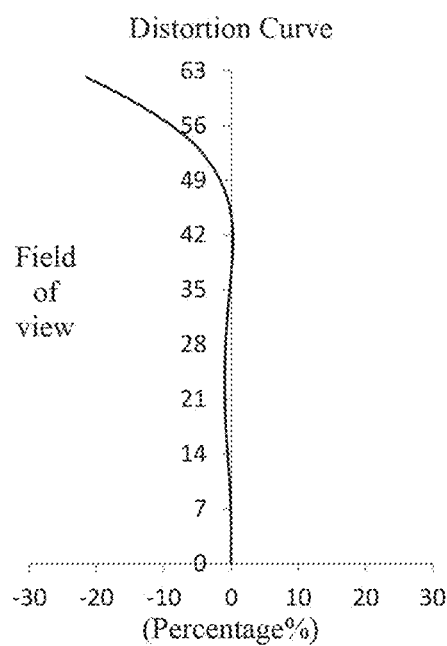
Figure 14D:
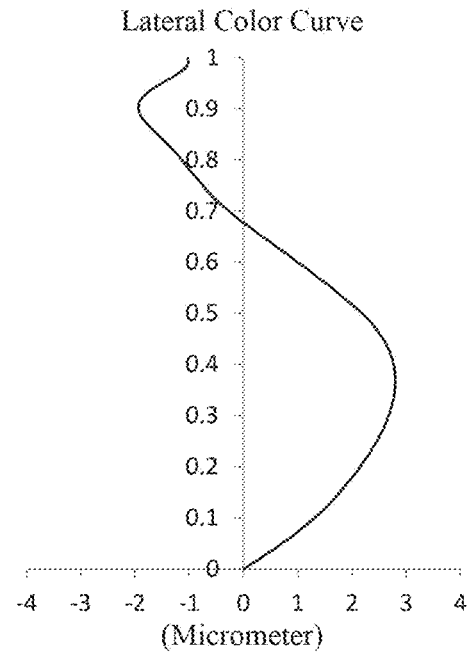

FIG. 14A illustrates a longitudinal aberration curve of the camera lens assembly according to example 7, representing deviations of focal points converged by light of different wavelengths after passing through the lens assembly. FIG. 14B illustrates an astigmatic curve of the camera lens assembly according to example 7, representing a curvature of a tangential plane and a curvature of a sagittal plane. FIG. 14C illustrates a distortion curve of the camera lens assembly according to example 7, representing amounts of distortion corresponding to different field-of-views. FIG. 14D illustrates a lateral color curve of the camera lens assembly according to example 7, representing deviations of different image heights on an imaging plane after light passes through the lens assembly. It can be seen from FIG. 14A to FIG. 14D that the camera lens assembly provided in example 7 may achieve good image quality.

Example 8

Figure 15:
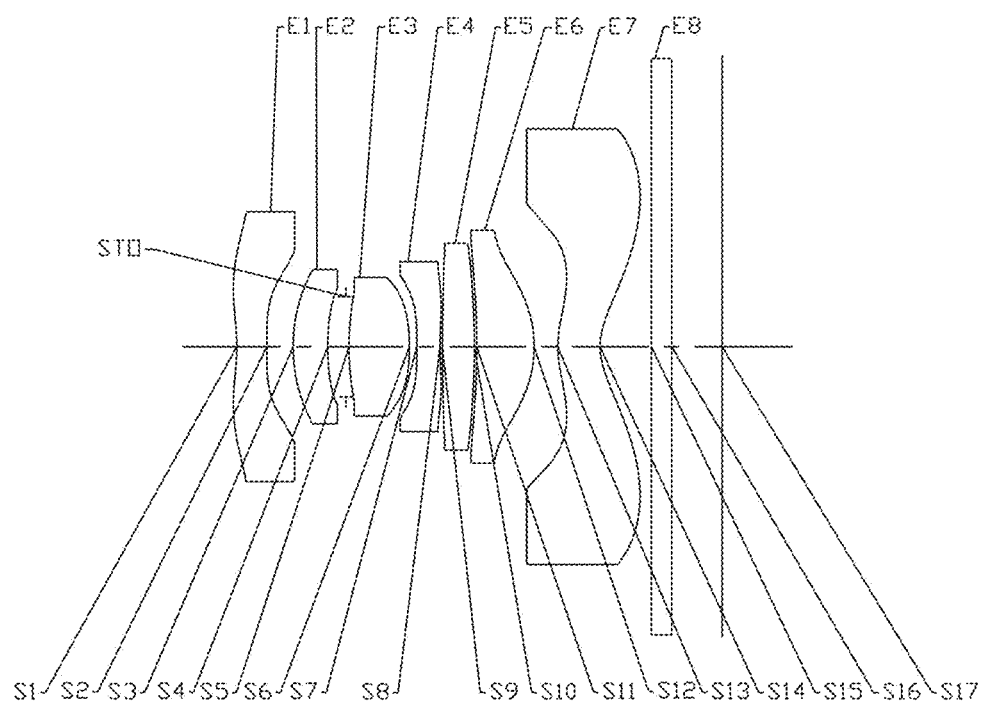
FIG. 15 illustrates a schematic structural view of a camera lens assembly according to Example 8 of the present disclosure.

A camera lens assembly according to example 8 of the present disclosure is described below with reference to FIG. 15 to FIG. 16D. FIG. 15 shows a schematic structural view of the camera lens assembly according to example 8 of the present disclosure.

As shown in FIG. 15, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a convex surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface.

The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 22 shows surface type, radius of curvature, thickness, material and conic coefficient of each lens of the camera lens assembly in example 8, wherein the units for the radius of curvature and the thickness are millimeter (mm). Table 23 shows high-order coefficients applicable to each aspheric surface in example 8, wherein the surface shape of each aspheric surface may be defined by the formula (1) given in the above example 1. Table 24 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 8.

TABLE 22

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −1.9180 | 0.3117 | 1.54 | 55.9 | −24.1318 |
| S2 | Aspheric | −32.2324 | 0.2723 | | | 24.9221 |
| S3 | Aspheric | 1.9296 | 0.3578 | 1.64 | 23.5 | 1.8549 |
| S4 | Aspheric | 2.7305 | 0.1885 | | | 4.6005 |
| STO | Spherical | Infinite | 0.0328 | | | |
| S5 | Aspheric | 3.2597 | 0.6243 | 1.55 | 56.1 | 3.1480 |
| S6 | Aspheric | −2.3461 | 0.0780 | | | 4.4505 |
| S7 | Aspheric | −13.8655 | 0.2400 | 1.67 | 20.4 | −99.0000 |
| S8 | Aspheric | 3.6035 | 0.0240 | | | −43.0028 |
| S9 | Aspheric | 10.0292 | 0.3310 | 1.55 | 56.1 | −66.1134 |
| S10 | Aspheric | −6.9339 | 0.0243 | | | −6.9718 |
| S11 | Aspheric | −9.5622 | 0.5955 | 1.55 | 56.1 | −3.6944 |
| S12 | Aspheric | −1.3727 | 0.2452 | | | −0.2103 |
| S13 | Aspheric | 1.0579 | 0.4380 | 1.54 | 55.9 | −8.2936 |
| S14 | Aspheric | 0.6615 | 0.5315 | | | −3.3533 |
| S15 | Spherical | Infinite | 0.2100 | 1.52 | 64.2 | |
| S16 | Spherical | Infinite | 0.5220 | | | |
| S17 | Spherical | Infinite | | | | |

TABLE 23

| Surface number | A4 | A6 | A8 | A10 | A12 | A14 | A16 | A18 | A20 |
|---|---|---|---|---|---|---|---|---|---|
| S1 | 3.5502E−01 | −4.2623E−01 | 3.9414E−01 | −2.6591E−01 | 1.1711E−01 | −3.0078E−02 | 3.3903E−03 | 0.0000E+00 | 0.0000E+00 |
| S2 | 9.4731E−01 | −1.3735E+00 | 1.7990E+00 | −1.4321E+00 | −2.2334E−01 | 9.1601E−01 | −3.3081E−01 | 0.0000E+00 | 0.0000E+00 |
| S3 | 1.8576E−01 | −5.7219E−01 | 1.3400E+00 | −2.6698E+00 | 2.8305E+00 | −1.9506E+00 | 1.1705E+00 | 0.0000E+00 | 0.0000E+00 |
| S4 | 1.8565E−01 | −6.6751E−01 | 7.5607E+00 | −4.6262E+01 | 1.6706E+02 | −3.2038E+02 | 2.6726E+02 | 0.0000E+00 | 0.0000E+00 |
| S5 | 7.1881E−02 | −8.9891E−01 | 1.3639E+01 | −1.3060E+02 | 7.6202E+02 | −2.7649E+03 | 6.0688E+03 | −7.3806E+03 | 3.8276E+03 |
| S6 | −4.3208E−01 | −1.8727E−01 | 6.7953E+00 | −5.5858E+01 | 2.4296E+02 | −6.3490E+02 | 1.0151E+03 | −9.2031E+02 | 3.6285E+02 |
| S7 | −8.8762E−01 | 2.2133E+00 | −1.2772E+01 | 6.5292E+01 | −2.4754E+02 | 6.2837E+02 | −9.6784E+02 | 8.1326E+02 | −2.8599E+02 |
| S8 | −7.1122E−01 | 3.4232E+00 | −1.4380E+01 | 4.0289E+01 | −7.4455E+01 | 9.1568E+01 | −7.1920E+01 | 3.2426E+01 | −6.3214E+00 |
| S9 | −3.5830E−01 | 3.0803E+00 | −1.4844E+01 | 4.2917E+01 | −7.8880E+01 | 9.3667E+01 | −6.9713E+01 | 2.9564E+01 | −5.4532E+00 |
| S10 | −8.5675E−03 | 1.0074E+00 | −6.6225E+00 | 2.1392E+01 | −4.0071E+01 | 4.5260E+01 | −3.0366E+01 | 1.1142E+01 | −1.7223E+00 |
| S11 | −6.7943E−02 | 8.4312E−01 | −5.3868E+00 | 1.7825E+01 | −3.3412E+01 | 3.7124E+01 | −2.4205E+01 | 8.5302E+00 | −1.2488E+00 |
| S12 | −3.6798E−01 | 1.7120E+00 | −4.5556E+00 | 8.4603E+00 | −1.0249E+01 | 7.9575E+00 | −3.7737E+00 | 9.7963E−01 | −1.0465E−01 |
| S13 | −3.7079E−01 | 3.4604E−01 | −2.6310E−01 | 2.0973E−02 | 1.9319E−01 | −2.3152E−01 | 1.2920E−01 | −3.5270E−02 | 3.7546E−03 |
| S14 | −2.1560E−01 | 2.1282E−01 | −1.6091E−01 | 8.5456E−02 | −3.1247E−02 | 7.6511E−03 | −1.1930E−03 | 1.0669E−04 | −4.1567E−06 |

TABLE 24

| | |
|---|---|
| TTL (mm) | 5.03 |
| ImgH (mm) | 3.03 |
| HFOV (°) | 62.8 |
| f (mm) | 2.05 |
| f1 (mm) | −3.81 |
| f2 (mm) | 8.68 |
| f3 (mm) | 2.60 |
| f4 (mm) | −4.27 |
| f5 (mm) | 7.56 |
| f6 (mm) | 2.86 |
| f7 (mm) | −5.36 |

Figure 16A:
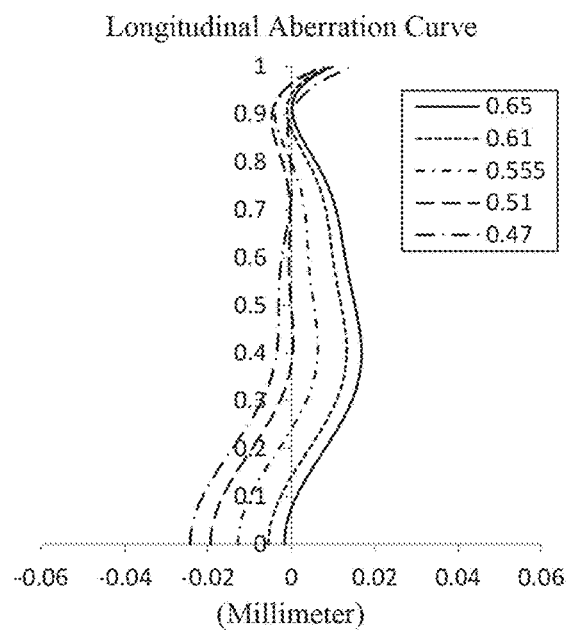
FIGS. 16A to 16D illustrate a longitudinal aberration curve, an astigmatic curve, a distortion curve, and a lateral color curve of the camera lens assembly of the Example 8, respectively.
Figure 16B:
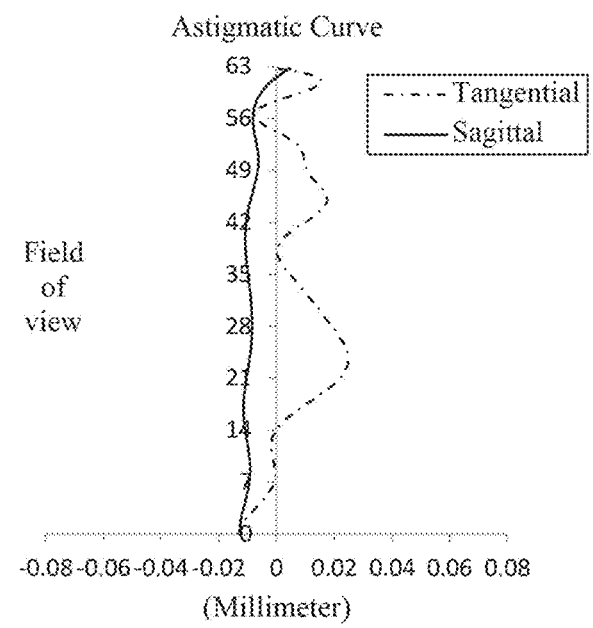
Figure 16C:
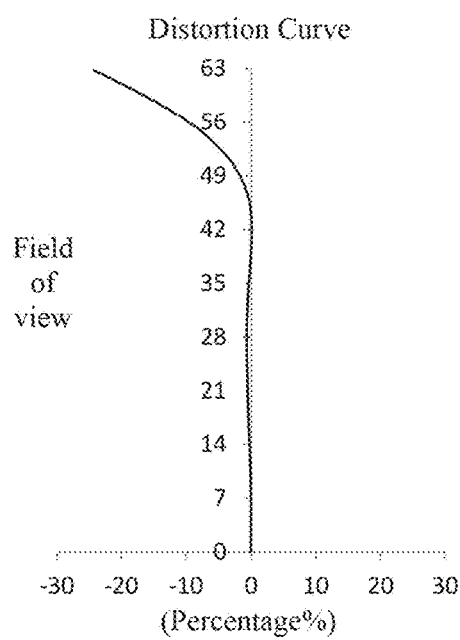
Figure 16D:
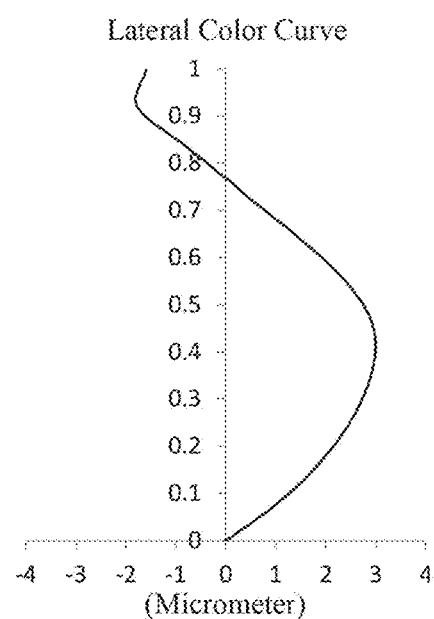

FIG. 16A illustrates a longitudinal aberration curve of the camera lens assembly according to example 8, representing deviations of focal points converged by light of different wavelengths after passing through the lens assembly. FIG. 16B illustrates an astigmatic curve of the camera lens assembly according to example 8, representing a curvature of a tangential plane and a curvature of a sagittal plane. FIG. 16C illustrates a distortion curve of the camera lens assembly according to example 8, representing amounts of distortion corresponding to different field-of-views. FIG. 16D illustrates a lateral color curve of the camera lens assembly according to example 8, representing deviations of different image heights on an imaging plane after light passes through the lens assembly. It can be seen from FIG. 16A to FIG. 16D that the camera lens assembly provided in example 8 may achieve good image quality.

Example 9

A camera lens assembly according to example 9 of the present disclosure is described below with reference to FIG. 17 to FIG. 18D. FIG. 17 shows a schematic structural view of the camera lens assembly according to example 9 of the present disclosure.

As shown in FIG. 17, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 25 shows surface type, radius of curvature, thickness, material and conic coefficient of each lens of the camera lens assembly in example 9, wherein the units for the radius of curvature and the thickness are millimeter (mm). Table 26 shows high-order coefficients applicable to each aspheric surface in example 9, wherein the surface shape of each aspheric surface may be defined by the formula (1) given in the above example 1. Table 27 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 9.

TABLE 25

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −2.3263 | 0.2870 | 1.54 | 55.9 | −38.8639 |
| S2 | Aspheric | 5.6295 | 0.2448 | | | 12.3160 |
| S3 | Aspheric | 1.6155 | 0.4026 | 1.64 | 23.5 | 1.7585 |
| S4 | Aspheric | 2.9594 | 0.1672 | | | 5.3240 |
| STO | Spherical | Infinite | 0.0446 | | | 0.0000 |
| S5 | Aspheric | 3.3632 | 0.5480 | 1.55 | 56.1 | 6.2493 |
| S6 | Aspheric | −2.4098 | 0.0240 | | | 4.9811 |
| S7 | Aspheric | −30.1459 | 0.2400 | 1.67 | 20.4 | 99.0000 |
| S8 | Aspheric | 3.7137 | 0.0240 | | | −22.7848 |
| S9 | Aspheric | 12.7928 | 0.3253 | 1.55 | 56.1 | 36.7826 |
| S10 | Aspheric | −5.4871 | 0.0243 | | | −14.1355 |
| S11 | Aspheric | −8.6444 | 0.6120 | 1.55 | 56.1 | 19.4261 |
| S12 | Aspheric | −1.2361 | 0.3515 | | | −0.2655 |
| S13 | Aspheric | −100.0000 | 0.9903 | 1.54 | 55.9 | −99.0000 |
| S14 | Aspheric | 1.5006 | 0.3422 | | | −3.0110 |
| S15 | Spherical | Infinite | 0.2100 | 1.52 | 64.2 | |
| S16 | Spherical | Infinite | 0.2772 | | | |
| S17 | Spherical | Infinite | | | | |

TABLE 26

| Surface number | A4 | A6 | A8 | A10 | A12 | A14 | A16 | A18 | A20 |
|---|---|---|---|---|---|---|---|---|---|
| S1 | 3.7566E−01 | −5.1259E−01 | 5.1041E−01 | −3.4850E−01 | 1.5123E−01 | −3.7711E−02 | 4.0573E−03 | 0.0000E+00 | 0.0000E+00 |
| S2 | 9.4719E−01 | −1.3917E+00 | 1.7358E+00 | −1.4289E+00 | 1.2785E+00 | −1.8386E+00 | 1.0055E+00 | 0.0000E+00 | 0.0000E+00 |
| S3 | 1.4560E−01 | −5.4633E−01 | 1.5843E+00 | −3.4965E+00 | 5.2278E+00 | −5.7144E+00 | 3.1538E+00 | 0.0000E+00 | 0.0000E+00 |
| S4 | 1.4656E−01 | 9.2541E−02 | −7.6464E−01 | 7.7389E+00 | −2.5555E+01 | 3.2896E+01 | 8.7561E+00 | 0.0000E+00 | 0.0000E+00 |
| S5 | 9.0616E−02 | −8.1723E−01 | 1.0218E+01 | −8.3966E+01 | 4.2379E+02 | −1.3377E+03 | 2.5501E+03 | −2.6723E+03 | 1.1846E+03 |
| S6 | −8.1806E−01 | 5.5946E+00 | −4.0001E+01 | 1.7054E+02 | −4.6422E+02 | 8.2003E+02 | −8.9585E+02 | 5.3268E+02 | −1.2126E+02 |
| S7 | −1.1778E+00 | 7.4186E+00 | −5.1107E+01 | 2.2362E+02 | −6.6285E+02 | 1.3406E+03 | −1.7442E+03 | 1.3074E+03 | −4.2876E+02 |
| S8 | −6.9389E−01 | 3.7817E+00 | −1.6982E+01 | 5.0399E+01 | −9.8473E+01 | 1.2560E+02 | −9.9560E+01 | 4.4268E+01 | −8.4374E+00 |
| S9 | −2.9189E−01 | 2.4282E+00 | −1.3293E+01 | 4.6351E+01 | −1.0364E+02 | 1.4834E+02 | −1.3143E+02 | 6.5678E+01 | −1.4167E+01 |
| S10 | 1.3651E−01 | −3.5052E−01 | 4.2908E−01 | −5.0862E−01 | 1.9127E+00 | −5.3435E+00 | 7.4760E+00 | −5.1066E+00 | 1.3705E+00 |

TABLE 26-continued

| Surface number | A4 | A6 | A8 | A10 | A12 | A14 | A16 | A18 | A20 |
|---|---|---|---|---|---|---|---|---|---|
| S11 | −7.8864E−02 | 2.0249E−01 | −3.7816E−01 | 1.0065E+00 | −1.6307E+00 | 5.0673E−01 | 1.7209E+00 | −2.0177E+00 | 6.6549E−01 |
| S12 | −1.2145E−01 | 4.5992E−01 | −8.9019E−01 | 1.5335E+00 | −1.4748E+00 | 6.1611E−01 | 1.1058E−01 | −2.0339E−01 | 5.5047E−02 |
| S13 | −3.4034E−01 | 4.3918E−01 | −7.1412E−01 | 9.5117E−01 | −9.7617E−01 | 7.0903E−01 | −3.4707E−01 | 1.0269E−01 | −1.3457E−02 |
| S14 | −1.4409E−01 | 1.1205E−01 | −6.6659E−02 | 2.8179E−02 | −8.1665E−03 | 1.5647E−03 | −1.8814E−04 | 1.2802E−05 | −3.7555E−07 |

TABLE 27

| | |
|---|---|
| TTL (mm) | 5.11 |
| ImgH (mm) | 3.03 |
| HFOV (°) | 62.7 |
| f (mm) | 2.14 |
| f1 (mm) | −3.03 |
| f2 (mm) | 4.94 |
| f3 (mm) | 2.66 |
| f4 (mm) | −4.95 |
| f5 (mm) | 7.08 |
| f6 (mm) | 2.57 |
| f7 (mm) | −2.74 |

Figure 18C:
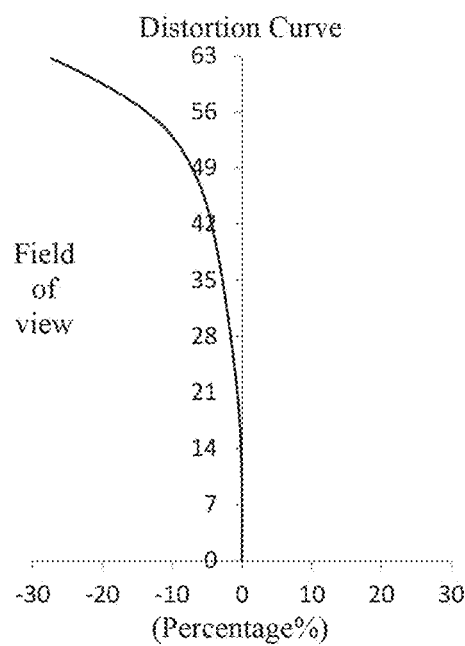
Figure 18D:
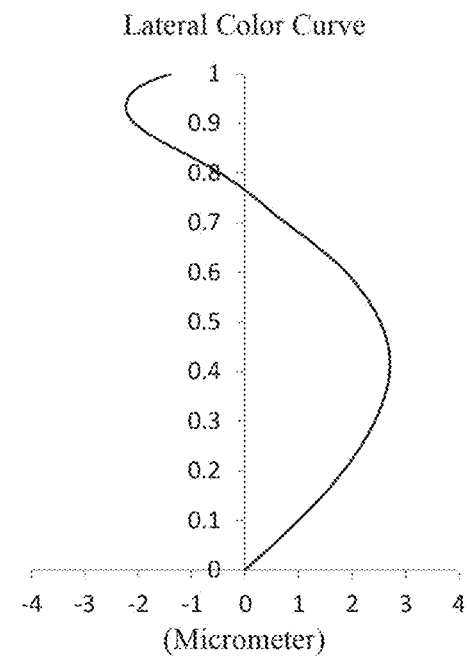

FIG. 18A illustrates a longitudinal aberration curve of the camera lens assembly according to example 9, representing deviations of focal points converged by light of different wavelengths after passing through the lens assembly. FIG. 18B illustrates an astigmatic curve of the camera lens assembly according to example 9, representing a curvature of a tangential plane and a curvature of a sagittal plane. FIG. 18C illustrates a distortion curve of the camera lens assembly according to example 9, representing amounts of distortion corresponding to different field-of-views. FIG. 18D illustrates a lateral color curve of the camera lens assembly according to example 9, representing deviations of different image heights on an imaging plane after light passes through the lens assembly. It can be seen from FIG. 18A to FIG. 18D that the camera lens assembly provided in example 9 may achieve good image quality.

Example 10

Figure 19:
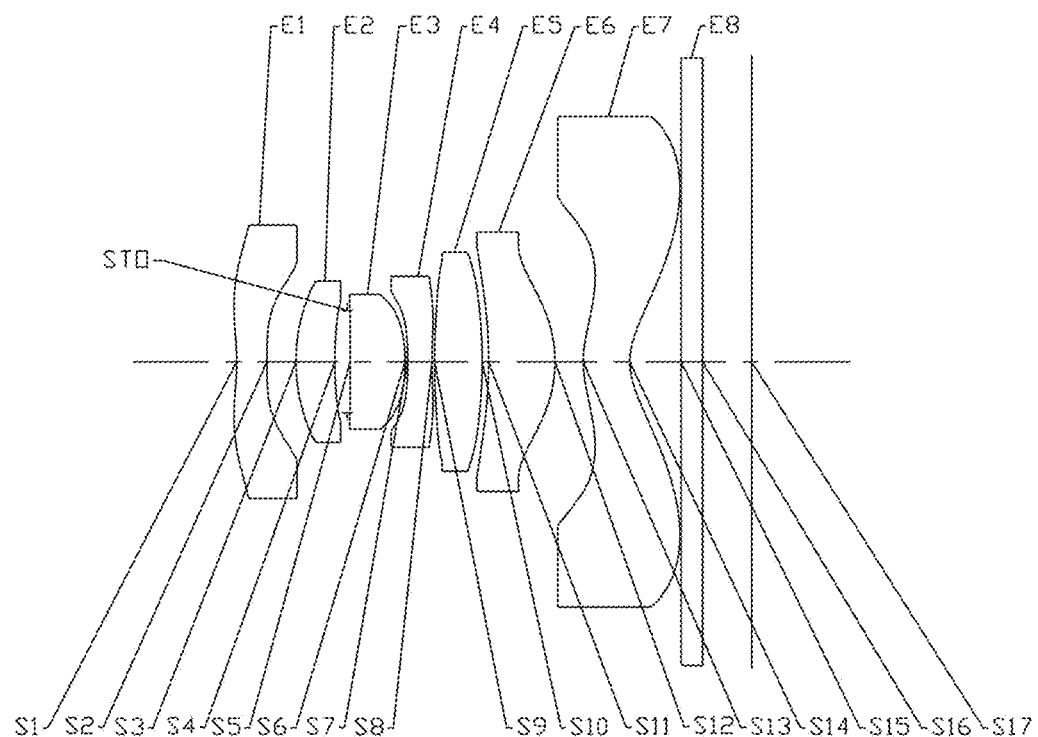
FIG. 19 illustrates a schematic structural view of a camera lens assembly according to Example 10 of the present disclosure.

A camera lens assembly according to example 10 of the present disclosure is described below with reference to FIG. 19 to FIG. 20D. FIG. 19 shows a schematic structural view of the camera lens assembly according to example 10 of the present disclosure.

As shown in FIG. 19, the camera lens assembly according to an exemplary embodiment of the present disclosure includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. There is an inflection point in the off-axis area on the object-side surface S1 of the first lens E1. The second lens E2 has positive refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 28 shows surface type, radius of curvature, thickness, material and conic coefficient of each lens of the camera lens assembly in example 10, wherein the units for the radius of curvature and the thickness are millimeter (mm). Table 29 shows high-order coefficients applicable to each aspheric surface in example 10, wherein the surface shape of each aspheric surface may be defined by the formula (1) given in the above example 1. Table 30 shows a total optical length TTL, half of a diagonal length ImgH of an effective pixel area on the imaging plane S17, half of a maximal field-of-view HFOV, and a total effective focal length f of the camera lens assembly, and effective focal lengths f1 to f7 of respective lens in example 10.

TABLE 28

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | −2.2921 | 0.2979 | 1.54 | 55.9 | −30.9127 |
| S2 | Aspheric | 20.7641 | 0.2857 | | | −40.7711 |
| S3 | Aspheric | 1.9726 | 0.3823 | 1.64 | 23.5 | 1.9208 |
| S4 | Aspheric | 5.1274 | 0.1206 | | | −23.7675 |
| STO | Spherical | Infinite | 0.0287 | | | |
| S5 | Aspheric | −8230.5550 | 0.5400 | 1.55 | 56.1 | 99.0000 |
| S6 | Aspheric | −1.7797 | 0.0244 | | | 4.5724 |
| S7 | Aspheric | −6.7354 | 0.2400 | 1.67 | 20.4 | −2.9444 |
| S8 | Aspheric | 3.8366 | 0.0240 | | | −46.2861 |
| S9 | Aspheric | 5.0884 | 0.4685 | 1.55 | 56.1 | −31.3464 |
| S10 | Aspheric | −4.6235 | 0.0631 | | | 7.3350 |
| S11 | Aspheric | −4.9334 | 0.6518 | 1.55 | 56.1 | −3.4804 |
| S12 | Aspheric | −1.4111 | 0.2778 | | | −0.2267 |
| S13 | Aspheric | 1.0440 | 0.4581 | 1.54 | 55.9 | −8.0098 |
| S14 | Aspheric | 0.6598 | 0.5044 | | | −3.1702 |
| S15 | Spherical | Infinite | 0.2100 | 1.52 | 64.2 | |
| S16 | Spherical | Infinite | 0.4823 | | | |
| S17 | Spherical | Infinite | | | | |

TABLE 29

| Surface number | A4 | A6 | A8 | A10 | A12 | A14 | A16 | A18 | A20 |
|---|---|---|---|---|---|---|---|---|---|
| S1 | 3.6716E−01 | −4.6682E−01 | 4.7599E−01 | −3.5434E−01 | 1.6915E−01 | −4.6054E−02 | 5.4028E−03 | 0.0000E+00 | 0.0000E+00 |
| S2 | 8.6839E−01 | −1.2017E+00 | 1.4201E+00 | −3.2149E−01 | −2.2809E+00 | 2.6798E+00 | −8.8043E−01 | 0.0000E+00 | 0.0000E+00 |
| S3 | 1.2628E−01 | −4.9996E−01 | 1.1014E+00 | −1.8227E+00 | 5.3925E−01 | 1.1073E+00 | −5.3478E−03 | 0.0000E+00 | 0.0000E+00 |
| S4 | 1.4471E−01 | −2.3050E−01 | 2.8554E+00 | −1.7641E+01 | 7.0352E+01 | −1.5311E+02 | 1.5897E+02 | 0.0000E+00 | 0.0000E+00 |
| S5 | 4.5980E−02 | −1.6453E+00 | 2.9076E+01 | −3.2768E+02 | 2.1977E+03 | −8.9031E+03 | 2.0849E+04 | −2.5198E+04 | 1.1292E+04 |
| S6 | −7.9716E−01 | 6.2847E+00 | −4.5660E+01 | 1.8775E+02 | −4.0618E+02 | 2.0770E+02 | 1.0237E+03 | −2.2255E+03 | 1.4123E+03 |
| S7 | −1.2168E+00 | 8.1806E+00 | −6.1888E+01 | 2.9869E+02 | −9.3717E+02 | 1.8813E+03 | −2.2399E+03 | 1.3370E+03 | −2.4635E+02 |
| S8 | −6.7988E−01 | 3.4795E+00 | −1.5608E+01 | 4.2545E+01 | −6.3648E+01 | 3.6542E+01 | 2.8803E+01 | −5.4148E+01 | 2.2933E+01 |
| S9 | −3.0136E−01 | 2.3655E+00 | −1.1694E+01 | 3.6232E+01 | −7.1636E+01 | 9.0808E+01 | −7.1472E+01 | 3.1800E+01 | −6.1048E+00 |
| S10 | 8.0031E−02 | −1.0598E−01 | −3.3405E−01 | 1.9037E+00 | −4.3289E+00 | 5.1970E+00 | −3.2518E+00 | 8.8171E−01 | −3.7046E−02 |
| S11 | −2.5505E−02 | 1.6409E−01 | −1.0330E+00 | 3.6625E+00 | −7.3048E+00 | 8.6366E+00 | −5.9459E+00 | 2.1747E+00 | −3.2277E−01 |
| S12 | −3.4458E−01 | 1.5863E+00 | −4.0549E+00 | 7.3254E+00 | −8.7499E+00 | 6.8313E+00 | −3.3361E+00 | 9.1790E−01 | −1.0804E−01 |
| S13 | −2.5593E−01 | 1.7060E−01 | −4.3445E−02 | −1.1171E−01 | 1.7393E−01 | −1.2755E−01 | 5.1926E−02 | −1.0981E−02 | 9.3287E−04 |
| S14 | −1.7831E−01 | 1.5969E−01 | −1.0928E−01 | 5.2979E−02 | −1.7781E−02 | 3.9941E−03 | −5.6970E−04 | 4.6474E−05 | −1.6478E−06 |

TABLE 30

| | |
|---|---|
| TTL (mm) | 5.06 |
| ImgH (mm) | 3.03 |
| HFOV (°) | 62.2 |
| f (mm) | 2.04 |
| f1 (mm) | −3.83 |
| f2 (mm) | 4.75 |
| f3 (mm) | 3.26 |
| f4 (mm) | −3.63 |
| f5 (mm) | 4.51 |
| f6 (mm) | 3.40 |
| f7 (mm) | −5.72 |

Figure 20A:
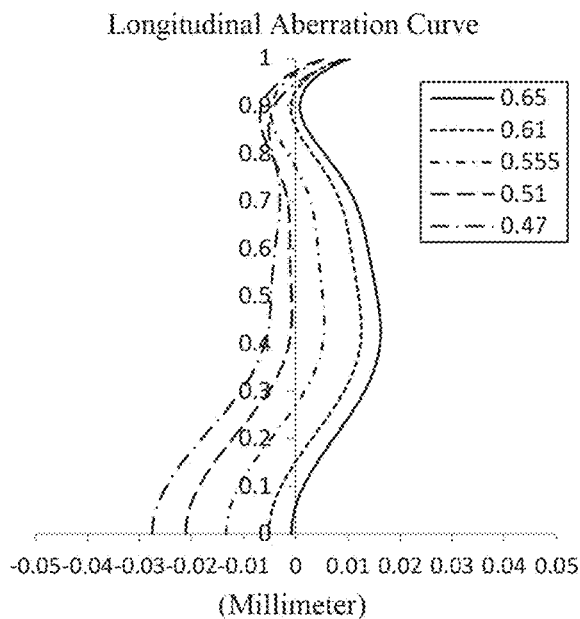
FIGS. 20A to 20D illustrate a longitudinal aberration curve, an astigmatic curve, a distortion curve, and a lateral color curve of the camera lens assembly of the Example 10, respectively.
Figure 20B:
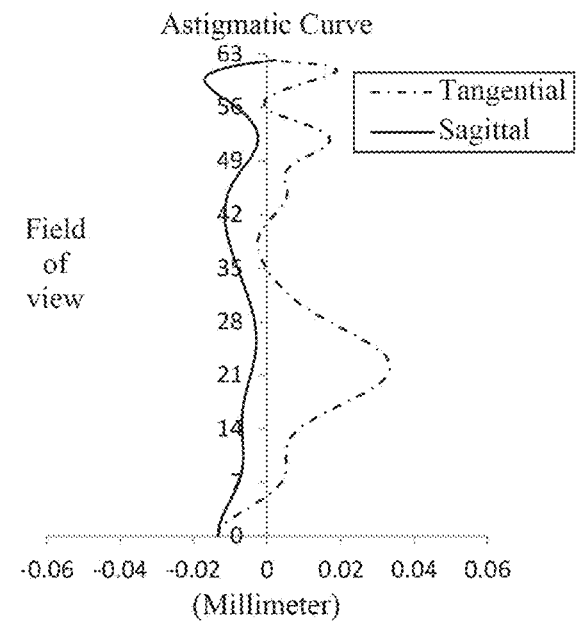
Figure 20C:
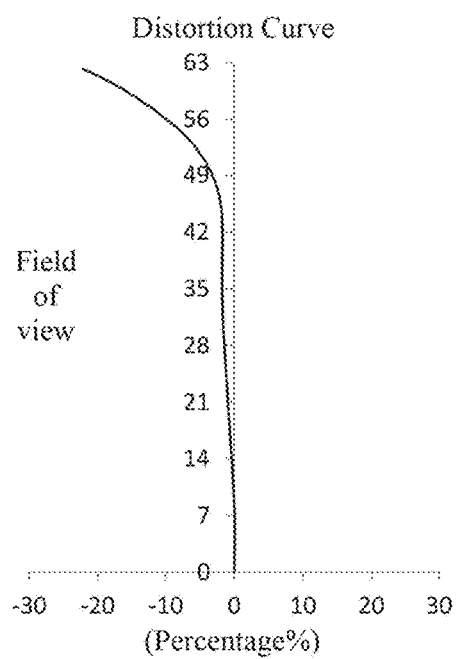
Figure 20D:
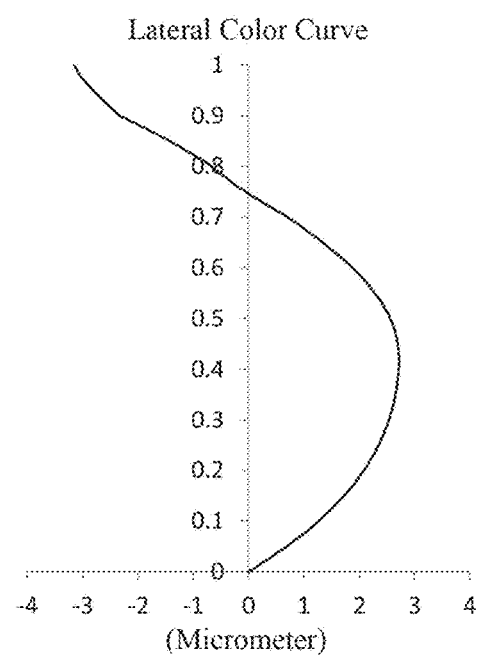

FIG. 20A illustrates a longitudinal aberration curve of the camera lens assembly according to example 10, representing deviations of focal points converged by light of different wavelengths after passing through the lens assembly. FIG. 20B illustrates an astigmatic curve of the camera lens assembly according to example 10, representing a curvature of a tangential plane and a curvature of a sagittal plane. FIG. 20C illustrates a distortion curve of the camera lens assembly according to example 10, representing amounts of distortion corresponding to different field-of-views. FIG. 20D illustrates a lateral color curve of the camera lens assembly according to example 10, representing deviations of different image heights on an imaging plane after light passes through the lens assembly. It can be seen from FIG. 20A to FIG. 20D that the camera lens assembly provided in example 10 may achieve good image quality.

In view of the above, examples 1 to 10 respectively satisfy the relationship shown in Table 31.

The present disclosure further provides a camera apparatus, having an electronic photosensitive element which may be a photosensitive Charge-Coupled Device (CCD) or a Complementary Metal-Oxide Semiconductor (CMOS). The camera apparatus may be an independent imaging device such as a digital camera, or may be a camera module integrated in a mobile electronic device such as a mobile phone. The camera apparatus is equipped with the camera lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, comprising, sequentially from an object side to an image side along an optical axis, a first lens, a second lens, a third lens, a fourth lens, a fifth lens, a sixth lens and a seventh lens,
wherein,
the first lens has negative refractive power;
the second lens has positive refractive power and a concave image-side surface;

TABLE 31

| Condition | Example | | | | | | | | | |
|---|---|---|---|---|---|---|---|---|---|---|
| | 1 | 2 | 3 | 4 | 5 | 6 | 7 | 8 | 9 | 10 |
| TTL/ImgH | 1.66 | 1.67 | 1.67 | 1.67 | 1.67 | 1.67 | 1.67 | 1.66 | 1.69 | 1.67 |
| f2/f | 3.63 | 3.54 | 3.12 | 3.50 | 3.51 | 3.54 | 3.S1 | 4.23 | 2.30 | 2.32 |
| (f2 − f1)/f | 5.29 | 5.14 | 4.67 | 5.13 | 5.13 | 5.15 | 5.20 | 6.09 | 3.71 | 4.20 |
| f3/f | 1.24 | 1.34 | 1.09 | 1.21 | 1.19 | 1.17 | 1.27 | 1.27 | 1.24 | 1.60 |
| f7/f | −2.39 | −2.75 | −2.84 | −2.72 | −2.84 | −2.89 | −2.71 | −2.61 | −1.28 | −2.80 |
| DT11/ImgH | 0.45 | 0.47 | 0.48 | 0.46 | 0.47 | 0.47 | 0.45 | 0.46 | 0.45 | 0.45 |
| DT32/DT42 | 0.82 | 0.93 | 0.90 | 0.91 | 0.98 | 0.98 | 0.86 | 0.88 | 0.89 | 0.84 |
| R14/f | 0.34 | 0.32 | 0.32 | 0.33 | 0.33 | 0.33 | 0.33 | 0.32 | 0.70 | 0.32 |
| \|(R3 − R4)/(R3 + R4)\| | 0.19 | 0.19 | 0.19 | 0.19 | 0.19 | 0.19 | 0.21 | 0.17 | 0.29 | 0.44 |
| CT3/(CT2 + CT4) | 0.99 | 1.14 | 1.09 | 1.11 | 1.14 | 1.16 | 0.99 | 1.04 | 0.85 | 0.87 |
| SD/TD | 0.70 | 0.70 | 0.68 | 0.70 | 0.69 | 0.69 | 0.68 | 0.70 | 0.74 | 0.72 |
| ET2/CT2 | 0.68 | 0.61 | 0.57 | 0.63 | 0.64 | 0.60 | 0.61 | 0.63 | 0.56 | 0.58 |
| YC1/DT11 | 0.38 | 0.43 | 0.47 | 0.41 | 0.42 | 0.43 | — | 0.43 | 0.39 | 0.40 |
| ET7/CT7 | 2.06 | 2.06 | 1.88 | 2.02 | 1.99 | 1.97 | 2.04 | 2.14 | 1.59 | 1.99 | the third lens has positive refractive power and a convex image-side surface;

the fourth lens has refractive power;

the fifth lens has refractive power;

the sixth lens has positive refractive power; and the seventh lens has negative refractive power, wherein $2<f2/f<4.5$, where $f2$ is an effective focal length of the second lens, and $f$ is a total effective focal length of the camera lens assembly.

2. The camera lens assembly according to claim 1, wherein $3.5<(f2-f1)/f<6.5$, where $f2$ is the effective focal length of the second lens, $f1$ is an effective focal length of the first lens, and $f$ is the total effective focal length of the camera lens assembly.

3. The camera lens assembly according to claim 1, wherein $|(R3-R4)/(R3+R4)|<0.5$, where $R3$ is a radius of curvature of an object-side surface of the second lens, and $R4$ is a radius of curvature of the image-side surface of the second lens.

4. The camera lens assembly according to claim 3, wherein $0.5<ET2/CT2<0.8$, where $ET2$ is an edge thickness of the second lens, and $CT2$ is a center thickness of the second lens along the optical axis.

5. The camera lens assembly according to claim 1, wherein $0.2<R14/f<0.8$, where $R14$ is a radius of curvature of an image-side surface of the seventh lens, and $f$ is the total effective focal length of the camera lens assembly.

6. The camera lens assembly according to claim 5, wherein $1.5<ET7/CT7<2.5$, where $ET7$ is an edge thickness of the seventh lens, and $CT7$ is a center thickness of the seventh lens along the optical axis.

7. The camera lens assembly according to claim 1, wherein $0.7<DT32/DT42<1$, where $DT32$ is an effective radius of the image-side surface of the third lens, and $DT42$ is an effective radius of an image-side surface of the fourth lens.

8. The camera lens assembly according to claim 1, wherein an object-side surface of the first lens has an inflection point in an off-axis area, and $0.2<YC1/DT11<0.8$, where $YC1$ is a vertical distance from a critical point on the object-side surface of the first lens to the optical axis, and $DT11$ is an effective radius of the object-side surface of the first lens.

9. The camera lens assembly according to claim 1, wherein $0.3<DT11/ImgH<0.6$, where $DT11$ is an effective radius of an object-side surface of the first lens, and $ImgH$ is half of a diagonal length of an effective pixel area on an imaging plane of the camera lens assembly.

10. The camera lens assembly according to claim 1, wherein the camera lens assembly further includes a stop, and $0.6<SD/TD<0.8$, where $SD$ is a distance along the optical axis from the stop to an image-side surface of the seventh lens, and $TD$ is a distance along the optical axis from an object-side surface of the first lens to the image-side surface of the seventh lens.

11. A camera lens assembly, comprising, sequentially from an object side to an image side along an optical axis, a first lens, a second lens, a third lens, a fourth lens, a fifth lens, a sixth lens and a seventh lens, wherein, the first lens has negative refractive power;

the second lens has positive refractive power and a concave image-side surface;

the third lens has refractive power and a convex image-side surface;

the fourth lens has negative refractive power;

the fifth lens has refractive power;

the sixth lens has positive refractive power; and the seventh lens has negative refractive power, wherein $3.5<(f2-f1)/f<6.5$, where $f2$ is an effective focal length of the second lens, $f1$ is an effective focal length of the first lens, and $f$ is a total effective focal length of the camera lens assembly.

12. A camera lens assembly, comprising, sequentially from an object side to an image side along an optical axis, a first lens, a second lens, a third lens, a fourth lens, a fifth lens, a sixth lens and a seventh lens, wherein, the first lens has negative refractive power;

the second lens has positive refractive power and a concave image-side surface;

the third lens has refractive power and a convex image-side surface;

the fourth lens has refractive power and a concave object-side surface;

the fifth lens has refractive power;

the sixth lens has positive refractive power; and the seventh lens has negative refractive power;

wherein $0.8<CT3/(CT2+CT4)<1.2$, where $CT3$ is a center thickness of the third lens along the optical axis, $CT2$ is a center thickness of the second lens along the optical axis, and $CT4$ is a center thickness of the fourth lens along the optical axis.

13. The camera lens assembly according to claim 12, wherein $TTL/ImgH<2$, where $TTL$ is a distance along the optical axis from an object-side surface of the first lens to an imaging plane of the camera lens assembly, and $ImgH$ is half of a diagonal length of an effective pixel area on the imaging plane of the camera lens assembly.

14. The camera lens assembly according to claim 13, wherein $0.3<DT11/ImgH<0.6$, where $DT11$ is an effective radius of the object-side surface of the first lens, and $ImgH$ is half of the diagonal length of the effective pixel area on the imaging plane of the camera lens assembly.

15. The camera lens assembly according to claim 12, wherein an object-side surface of the first lens has an inflection point in an off-axis area, and $0.2<YC1/DT11<0.8$, where $YC1$ is a vertical distance from a critical point on the object-side surface of the first lens to the optical axis, and $DT11$ is an effective radius of the object-side surface of the first lens.

16. The camera lens assembly according to claim 12, wherein $1<f3/f<1.8$, where $f3$ is an effective focal length of the third lens, and $f$ is a total effective focal length of the camera lens assembly.

17. The camera lens assembly according to claim 12, wherein $1.5<ET7/CT7<2.5$, where $ET7$ is an edge thickness of the seventh lens, and $CT7$ is a center thickness of the seventh lens along the optical axis.

18. The camera lens assembly according to claim 17, wherein $-3<f7/f<-1$, where $f7$ is an effective focal length of the seventh lens, and $f$ is a total effective focal length of the camera lens assembly.

19. The camera lens assembly according to claim 17, wherein $0.2 < R14/f < 0.8$, where R14 is a radius of curvature of an image-side surface of the seventh lens, and f is a total effective focal length of the camera lens assembly.

* * * * *